(12) United States Patent
Rains, Jr. et al.

(10) Patent No.: US 7,604,375 B2
(45) Date of Patent: Oct. 20, 2009

(54) OPTICAL INTEGRATING CHAMBER LIGHTING USING ONE OR MORE ADDITIONAL COLOR SOURCES TO ADJUST WHITE LIGHT

(75) Inventors: Jack C. Rains, Jr., Oak Hill, VA (US); Matthew Brown, Falls Church, VA (US)

(73) Assignee: Advanced Optical Technologies, LLC, Herndon, VA (US)

( * ) Notice: Subject to any disclaimer, the term of this patent is extended or adjusted under 35 U.S.C. 154(b) by 0 days.

(21) Appl. No.: 12/149,315

(22) Filed: Apr. 30, 2008

(65) Prior Publication Data
US 2008/0205053 A1 Aug. 28, 2008

Related U.S. Application Data

(63) Continuation of application No. 10/558,481, filed as application No. PCT/US2005/013779 on Apr. 25, 2005.

(51) Int. Cl.
*F21V 9/00* (2006.01)
(52) U.S. Cl. ........................ 362/231; 362/230; 362/227
(58) Field of Classification Search ................ 362/227, 362/228, 229, 230, 231, 240, 243, 246, 247, 362/281, 800, 612–614, 543–545
See application file for complete search history.

(56) References Cited

U.S. PATENT DOCUMENTS

| | | | |
|---|---|---|---|
| 3,780,357 A | 12/1973 | Haitz | |
| 4,677,533 A | 6/1987 | McDermott et al. | |
| 4,962,687 A | 10/1990 | Belliveau et al. | |
| 4,992,704 A | 2/1991 | Stinson | |
| 5,241,459 A | 8/1993 | Kaplan et al. | |
| 5,365,084 A | 11/1994 | Cochran et al. | |
| 5,400,228 A | 3/1995 | Kao | |

(Continued)

FOREIGN PATENT DOCUMENTS

DE 200 07 134 U1 9/2000

(Continued)

OTHER PUBLICATIONS

"Industrial Equipment News . . . The Leading Publisher of New Products Worldwide" IEN, Apr. 2003, www.inquiryexpress.com.

(Continued)

*Primary Examiner*—Bao Q Truong
(74) *Attorney, Agent, or Firm*—McDermott Will & Emery LLP

(57) ABSTRACT

A system provides white light having a selectable spectral characteristic (e.g. a selectable color temperature) using an optical integrating cavity to combine energy of different wavelengths from different sources with white light. The cavity has a diffusely reflective interior surface and an aperture for allowing emission of combined light. Control of the intensity of emission of the sources sets the amount of primary color light of each wavelength added to the substantially white input light output and thus determines a spectral characteristic of the white light output through the aperture. A variety of different elements may optically process the combined light output, such a deflector, a variable iris, a lens, a variable focusing lens system, a collimator, a holographic diffuser and combinations thereof.

48 Claims, 10 Drawing Sheets

U.S. PATENT DOCUMENTS

| | | | |
|---|---|---|---|
| 5,420,482 A | 5/1995 | Phares | |
| 5,453,849 A | 9/1995 | Copenhaver et al. | |
| 5,471,052 A | 11/1995 | Ryczek | |
| 5,548,493 A | 8/1996 | Young | |
| 5,608,213 A | 3/1997 | Pinkus et al. | |
| 5,650,843 A | 7/1997 | Moberg et al. | |
| 5,752,766 A | 5/1998 | Bailey et al. | |
| 5,757,111 A | 5/1998 | Sato | |
| 5,803,592 A | 9/1998 | Lawson | |
| 5,838,247 A | 11/1998 | Bladowski | |
| 5,877,490 A | 3/1999 | Ramer et al. | |
| 5,899,557 A | 5/1999 | McDermott | |
| 5,914,487 A | 6/1999 | Ramer et al. | |
| 6,007,209 A | 12/1999 | Pelka | |
| 6,007,225 A | 12/1999 | Ramer et al. | |
| 6,016,038 A | 1/2000 | Mueller et al. | |
| 6,084,250 A | 7/2000 | Justel et al. | |
| 6,127,783 A | 10/2000 | Pashley et al. | |
| 6,139,166 A | 10/2000 | Marshall et al. | |
| 6,149,283 A | 11/2000 | Conway et al. | |
| 6,150,774 A | 11/2000 | Mueller et al. | |
| 6,166,496 A | 12/2000 | Lys et al. | |
| 6,183,086 B1 | 2/2001 | Neubert | |
| 6,184,628 B1 | 2/2001 | Ruthenberg | |
| 6,200,002 B1 | 3/2001 | Marshall et al. | |
| 6,211,626 B1 | 4/2001 | Lys et al. | |
| 6,219,140 B1 | 4/2001 | Kaplan | |
| 6,222,172 B1 | 4/2001 | Fossum et al. | |
| 6,222,623 B1 | 4/2001 | Wetherell | |
| 6,234,648 B1 | 5/2001 | Borner et al. | |
| 6,238,077 B1 | 5/2001 | Ramer et al. | |
| 6,257,737 B1 | 7/2001 | Marshall et al. | |
| 6,266,136 B1 | 7/2001 | Ramer et al. | |
| 6,273,589 B1 | 8/2001 | Weber et al. | |
| 6,280,054 B1 | 8/2001 | Cassarly et al. | |
| 6,286,979 B1 | 9/2001 | Ramer et al. | |
| 6,292,901 B1 | 9/2001 | Lys et al. | |
| 6,299,328 B1 | 10/2001 | Wilson | |
| 6,299,329 B1 | 10/2001 | Mui et al. | |
| 6,334,700 B2 | 1/2002 | Ramer et al. | |
| 6,340,868 B1 | 1/2002 | Lys et al. | |
| 6,342,695 B1 | 1/2002 | Ramer et al. | |
| 6,357,889 B1 | 3/2002 | Duggal et al. | |
| 6,357,893 B1 | 3/2002 | Belliveau | |
| 6,361,192 B1 | 3/2002 | Fussell et al. | |
| 6,422,718 B1 | 7/2002 | Anderson et al. | |
| 6,441,558 B1 | 8/2002 | Muthu et al. | |
| 6,459,919 B1 | 10/2002 | Lys et al. | |
| 6,488,389 B2 | 12/2002 | Cassarly et al. | |
| 6,523,977 B2 | 2/2003 | Chuang et al. | |
| 6,525,668 B1 | 2/2003 | Petrick | |
| 6,527,411 B1 | 3/2003 | Sayers | |
| 6,528,954 B1 | 3/2003 | Lys et al. | |
| 6,533,429 B2 | 3/2003 | Yoneda | |
| 6,536,914 B2 | 3/2003 | Hoelen et al. | |
| 6,547,416 B2 | 4/2003 | Pashley et al. | |
| 6,548,967 B1 | 4/2003 | Dowling et al. | |
| 6,577,080 B2 | 6/2003 | Lys et al. | |
| 6,601,974 B1 | 8/2003 | Hewlett et al. | |
| 6,607,794 B1 | 8/2003 | Wilson et al. | |
| 6,608,453 B2 | 8/2003 | Morgan et al. | |
| 6,621,239 B1 | 9/2003 | Belliveau | |
| 6,624,597 B2 | 9/2003 | Dowling et al. | |
| 6,626,558 B2 | 9/2003 | Momot et al. | |
| 6,636,003 B2 | 10/2003 | Rahm et al. | |
| 6,659,622 B2 | 12/2003 | Katogi et al. | |
| 6,676,282 B2 | 1/2004 | Begemann et al. | |
| 6,692,136 B2 | 2/2004 | Marshall et al. | |
| 6,700,112 B2 | 3/2004 | Brown | |
| 6,717,376 B2 | 4/2004 | Lys et al. | |
| 6,720,745 B2 | 4/2004 | Lys et al. | |
| 6,744,223 B2 | 6/2004 | Laflamme et al. | |
| 6,744,693 B2 | 6/2004 | Brockmann et al. | |
| 6,759,814 B2 | 7/2004 | Vogel et al. | |
| 6,774,584 B2 | 8/2004 | Lys et al. | |
| 6,777,891 B2 | 8/2004 | Lys et al. | |
| 6,781,329 B2 | 8/2004 | Mueller et al. | |
| 6,788,011 B2 | 9/2004 | Mueller et al. | |
| 6,793,374 B2 | 9/2004 | Begemann | |
| 6,801,003 B2 | 10/2004 | Schanberger et al. | |
| 6,806,659 B1 | 10/2004 | Mueller et al. | |
| 6,836,083 B2 | 12/2004 | Mukai | |
| 6,840,652 B1 | 1/2005 | Hymer | |
| 6,854,857 B2 | 2/2005 | Hara et al. | |
| 6,869,204 B2 | 3/2005 | Morgan et al. | |
| 6,869,206 B2 | 3/2005 | Zimmerman et al. | |
| 6,883,929 B2 | 4/2005 | Dowling | |
| 6,888,322 B2 | 5/2005 | Dowling et al. | |
| 6,897,624 B2 | 5/2005 | Lys et al. | |
| 6,936,978 B2 | 8/2005 | Morgan et al. | |
| 6,960,872 B2 | 11/2005 | Beeson et al. | |
| 6,965,205 B2 | 11/2005 | Piepgras et al. | |
| 6,967,448 B2 | 11/2005 | Morgan et al. | |
| 6,969,954 B2 | 11/2005 | Lys | |
| 6,975,079 B2 | 12/2005 | Lys et al. | |
| 6,995,355 B2 * | 2/2006 | Rains et al. | 250/228 |
| 7,012,382 B2 | 3/2006 | Cheang et al. | |
| 7,014,336 B1 | 3/2006 | Ducharme et al. | |
| 7,025,464 B2 | 4/2006 | Beeson et al. | |
| 7,031,920 B2 | 4/2006 | Dowling et al. | |
| 7,038,398 B1 | 5/2006 | Lys et al. | |
| 7,038,399 B2 | 5/2006 | Lys et al. | |
| 7,040,774 B2 | 5/2006 | Beeson et al. | |
| 7,042,172 B2 | 5/2006 | Dowling et al. | |
| 7,048,385 B2 | 5/2006 | Beeson et al. | |
| 7,064,498 B2 | 6/2006 | Dowling et al. | |
| 7,108,413 B2 | 9/2006 | Kwong et al. | |
| 7,144,131 B2 * | 12/2006 | Rains | 362/231 |
| 7,145,125 B2 | 12/2006 | May et al. | |
| 7,148,470 B2 | 12/2006 | Rains, Jr. et al. | |
| 7,157,694 B2 | 1/2007 | May et al. | |
| 7,159,986 B2 | 1/2007 | Bremer et al. | |
| 7,220,039 B2 | 5/2007 | Ahn et al. | |
| 7,293,908 B2 | 11/2007 | Beeson et al. | |
| 7,374,311 B2 | 5/2008 | Rains, Jr. et al. | |
| 2002/0064043 A1 | 5/2002 | Ariga et al. | |
| 2002/0145708 A1 | 10/2002 | Childers et al. | |
| 2002/0191416 A1 | 12/2002 | Wesson | |
| 2003/0034985 A1 | 2/2003 | Needham Riddle et al. | |
| 2003/0076056 A1 | 4/2003 | Schuurmans | |
| 2003/0117796 A1 | 6/2003 | Voser | |
| 2003/0193816 A1 | 10/2003 | Rahn | |
| 2003/0197113 A1 | 10/2003 | Pitigoi-Aron et al. | |
| 2004/0105264 A1 | 6/2004 | Spero | |
| 2004/0151008 A1 | 8/2004 | Artsyukhovich et al. | |
| 2004/0156199 A1 | 8/2004 | Rivas et al. | |
| 2004/0160199 A1 | 8/2004 | Morgan et al. | |
| 2004/0188594 A1 | 9/2004 | Brown et al. | |
| 2004/0232812 A1 | 11/2004 | Beeson et al. | |
| 2004/0233655 A1 | 11/2004 | Zimmerman et al. | |
| 2004/0233664 A1 | 11/2004 | Beeson et al. | |
| 2005/0040774 A1 | 2/2005 | Mueller et al. | |
| 2005/0062446 A1 | 3/2005 | Ashdown | |
| 2005/0063063 A1 | 3/2005 | Ashdown | |
| 2005/0156103 A1 | 7/2005 | May et al. | |
| 2005/0161586 A1 * | 7/2005 | Rains et al. | 250/214.1 |
| 2006/0001381 A1 | 1/2006 | Robinson et al. | |
| 2006/0028156 A1 | 2/2006 | Jungwirth | |

FOREIGN PATENT DOCUMENTS

| | | |
|---|---|---|
| EP | 1 176 849 A2 | 1/2002 |
| JP | 08-180978 | 7/1996 |
| WO | WO 00/19141 | 4/2000 |

| | | |
|---|---|---|
| WO | WO 02/076150 A1 | 9/2002 |
| WO | WO 03/069219 A1 | 8/2003 |
| WO | WO 2004/011846 A1 | 2/2004 |

OTHER PUBLICATIONS

"Source Four Revolution", 2003.

Steigerwald, Daniel A., et al. "Illumination with Solid State Lighting Technology." IEEE Journal on Selected Topics in Quantum Electronics, vol. 8, No. 2, Mar./Apr. 2002, pp. 310-320.

"LSI Unveils the LumeLEX™ at ARC06", Product News, Lighting Services Inc., URL: http//www.lightingservicesinc.com/press_article.asp?pressID=103, printed Feb. 16, 2006.

"TIR Systems' Partner Lighting Services Inc. Unveils First Product Based on Lexel™ Technology at ARC06 In London", Press Release, Feb. 13, 2006.

"Bridging the Gap for LEDs in the Architectural and Lighting Markets", Brent York, TIR Systems Ltd., Blue 2005, May 16-19.

"Commercializing Innovative SSL Technology: From the Laboratory to Lighting", Leonard Hordyk, TIR Systems Limited, Strategies in Light, Feb. 16, 2006.

LightFair International 2005, "Workshop 4: LED Technology—Bridging the Gap: From LEDs to Lighting", Grant Harlow, TIR Systems Ltd., Apr. 11, 2005.

Inventor's Aug. 23, 2007 Declaration for Compliance with Duty of Disclosure under 37 CFR §§1.56 with exhibits.

May 30, 2007 Official Action for U.S. Appl. No. 11/233,036.

International Preliminary Report on Patentability, issued Nov. 1, 2006, concerning International Application No. PCT/US2005/013779, filed on Apr. 25, 2005, along with the Written Opinion of the International Searching Authority.

European Search Report issued in European Patent Application No. 05758377.5-1268/1740883 dated Jul. 2, 2008.

European Search Report issued in European Patent Application No. 05740253.9-1268/1740882 dated on Jul. 4, 2008.

European Search Report issued in European Patent Application No. 05756155.7-1268/1740350 dated Jul. 2, 2008.

European Exam Report issued in European Patent Application No. 05 756 155.7, mailed May 13, 2009.

"Developmental Product Technical Data Bulletin" Ferro Corporation-Specialty Plastics Group, Filled and Reinforced Plastics Division, Evansvlle, IN (Jan. 2002).

"Holographic Diffusers", EO Edmund Industrial Optics, available at http://www.edmundoptics.com/onlinecatalog/DisplayProduct.cfm?productid-1363 (2004).

Tawil, Joe, et al. "Colorimetry." URL: http://www.cameraguild.com/technology/colorimetry.htm, pp. 1-13 (2003).

Canadian Office Action issued in Canadian Patent Application No. 2,658,958, mailed Jun. 17, 2009.

* cited by examiner

OPTICAL INTEGRATING CHAMBER LIGHTING USING ONE OR MORE ADDITIONAL COLOR SOURCES TO ADJUST WHITE LIGHT

REFERENCE TO RELATED APPLICATIONS

This application is a continuation of U.S. application Ser. No. 10/558,481 filed Nov. 28, 2005, which is a U.S. National Phase under 35 U.S.C. 371 of International Application No. PCT/US2005/013779, filed Apr. 25, 2005, which in turn claims the benefit of U.S. application Ser. No. 10/832,464, filed Apr. 27, 2004 (now U.S. Pat. No. 6,995,355, issued Feb. 7, 2006); U.S. application Ser. No. 10/558,481 is also a Continuation-In-Part and claims the benefit of the filing date of U.S. patent application Ser. No. 10/832,464 filed on Apr. 27, 2004, now U.S. Pat. No. 6,995,355, the disclosures of which Applications are incorporated by reference herein in their entirety.

TECHNICAL FIELD

The present teachings relate to techniques and equipment to provide white light having a selectable spectral characteristic (e.g. a selectable color temperature), by combining substantially white light with selected amounts of light of two or more different wavelengths (e.g. primary colors), using an optical cavity.

BACKGROUND

An increasing variety of lighting applications require a precisely controlled spectral characteristic of light. There are many variations of light that appear white. Sunlight, for example, appears warmer than white light from a fluorescent fixture. Light from an incandescent bulb often appears somewhat reddish in color. Yet, humans perceive such lights as 'white.' Even for light that appears 'white' to the human eye, many applications call for different characteristics of the white light. Typical white light sources provide light of a fixed nature, so that it is often necessary to use a different lighting device for each different application.

It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes as the sources of the different light colors.

Light emitting diodes (LEDs) were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Systems are known which combine controlled amounts of projected light from at least two LEDs of different primary colors. Attention is directed, for example, to U.S. Pat. Nos. 6,459,919, 6,166,496 and 6,150,774. Typically, such systems have relied on using pulse-width modulation or other modulation of the LED driver signals to adjust the intensity of each LED color output. The modulation requires complex circuitry to implement. Also, such prior systems have relied on direct radiation or illumination from the individual source LEDs. In some applications, the LEDs may represent undesirably bright sources if viewed directly. Also, the direct illumination from LEDs providing multiple colors of light has not provided optimum combination throughout the field of illumination. In some systems, the observer can see the separate red, green and blue lights from the LEDs at short distances from the fixture, even if the LEDs are covered by a translucent diffuser. Integration of colors by the eye becomes effective only at longer distances.

Another problem arises from long-term use of LED type light sources. As the LEDs age, the output intensity for a given input level of the LED drive current decreases. As a result, it may be necessary to increase power to an LED to maintain a desired output level. This increases power consumption. In some cases, the circuitry may not be able to provide enough light to maintain the desired light output level. As performance of the LEDs of different colors declines differently with age (e.g. due to differences in usage), it may be difficult to maintain desired relative output levels and therefore difficult to maintain the desired spectral characteristics of the combined output. The output levels of LEDs also vary with actual temperature (thermal) that may be caused by difference in ambient conditions or different operational heating and/or cooling of different LEDs. Temperature induced changes in performance cause changes in the spectrum of light output.

Another problem with existing multi-color LED systems arises from control of the overall system output intensity. In existing systems, to adjust the combined output intensity, e.g. to reduce or increase overall brightness, the user must adjust the LED power levels. However, LED spectral characteristics change with changes in power level. If the light colors produced by the LEDs change, due to a power level adjustment, it becomes necessary to adjust the modulations to compensate in order to achieve the same spectral characteristic.

U.S. Pat. No. 6,007,225 to Ramer et al. (Assigned to Advanced Optical Technologies, L.L.C.) discloses a directed lighting system utilizing a conical light deflector. At least a portion of the interior surface of the conical deflector has a specular reflectivity. In several disclosed embodiments, the source is coupled to an optical integrating cavity; and an outlet aperture is coupled to the narrow end of the conical light deflector. This patented lighting system provides relatively uniform light intensity and efficient distribution of light over a field of illumination defined by the angle and distal edge of the deflector. However, this patent does not discuss particular color combinations or effects.

Hence, a need still exists for a technique to efficiently provide white light of a selectable characteristic. A related need still exists for such a system that does not require complex electronics (e.g. modulation circuitry) to control the intensity of the energy output from the sources of the radiant energy of different wavelengths. A need also exists for a technique to effectively maintain a desired energy output level and the desired spectral characteristic of the combined output as LED performance decreases with age, preferably without requiring excessive power levels.

SUMMARY

As disclosed herein, an apparatus for emitting light includes an optical cavity, having a diffusely reflective interior surface and an aperture for allowing emission of combined light. Sources supply light into the interior of the cavity. One of the sources provides substantially white light, and at least two other sources emit radiant energy of different wavelengths. The cavity effectively combines the substantially white light with the light of the different wavelengths, to provide adjusted white light of a desired spectral characteristic, e.g. color temperature, for emission from an aperture of the cavity.

The apparatus may include an optical processing element coupled to the aperture of the optical cavity. A variety of different optical processing elements are disclosed. Individual examples may be selected or two or more such elements may be used in combination, to facilitate use of the apparatus for a particular application. Disclosed examples of the optical processing element include deflectors of various shapes and reflective characteristics, collimators, various lenses, focusing systems, irises, diffusers, holographic diffusers and the like.

A system using an apparatus as disclosed herein typically will include a control circuit, coupled to at least the sources of the light of the two specified wavelengths for establishing output intensity of light energy of each of those sources. Control of the intensity of emission of these sources sets a spectral characteristic of the combined white light emitted through the aperture. If the fixture includes a variable iris, the output intensity may be adjusted by adjustment of the iris opening without the need to change the power levels of the sources, and thus without impact on the spectral characteristic of the output.

In the examples, each source of a specified light wavelength typically comprises one or more light emitting diodes (LEDs). It is possible to install any desirable number of LEDs. Hence, in several examples, the sources may comprise one or more LEDs for emitting light of a first color, and one or more LEDs for emitting light of a second color, wherein the second color is different from the first color. In a similar fashion, the apparatus may include additional LED sources of a third color, a fourth color, etc. To achieve the highest color-rendering index (CRI), the LED array may include LEDs of colors that effectively cover the entire visible spectrum. The LED sources can include any color or wavelength, but typically include red, green, and blue.

A number of different white light sources are disclosed. The white light source may be one or more white LEDs. Alternatively, such fixtures may utilize other light sources or lamps, such as incandescent or fluorescent light bulbs. The white light from the source is substantially white, in that a human would likely perceive it as white, although it is not necessarily true white in the spectral sense. Typically, the spectral characteristic of the input white light is relatively fixed, particularly when the source operates at a given power level. The white light from the source, however, will not by itself always provide the desired spectral characteristic. The light from the colored LEDs provides a selectable adjustment or correction to the white light output of the apparatus.

The integrating or mixing capability of the optical cavity serves to project white light of any adjusted color characteristic, by adjusting the intensity of the various color light sources coupled to the cavity. Hence, it is possible to control color rendering index, as well as color temperature or balance. The system works with the totality of light output from a white light source and a family of LEDs. However, to provide color adjustment or variability, it is not necessary to control the output of individual LEDs, except as the intensity of each contributes to the totality. For example, it is not necessary to modulate the LED outputs. Also, the distribution pattern of the LEDs is not significant. The LEDs can be arranged in any manner to supply radiant energy within the optical cavity, although typically direct view from outside the fixture is avoided.

An exemplary system includes a number of "sleeper" LEDs that would be activated only when needed, for example, to maintain the light output, color, color temperature or thermal temperature. Hence, examples are also disclosed in which the first color LEDs comprise one or more initially active LEDs for emitting light of the first color and one or more initially inactive LEDs for emitting light of the first color on an as needed basis. Similarly, the second color LEDs include one or more initially active LEDs for emitting light of the second color and one or more initially inactive LEDs for emitting light of the second color on an as needed basis. In a similar fashion, the apparatus may include additional active and inactive LED sources of a third color, fourth color, etc. or active and inactive LED sources of white light.

As noted in the background, as LEDs age or experience increases in thermal temperature, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

A number of different examples of control circuits are discussed below. In one example, the control circuitry comprises a color sensor coupled to detect color distribution in the combined radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the combined radiant energy.

A number of other control circuit features also are disclosed. For example, the control circuitry may also include a temperature sensor. In such an example, the logic circuitry is also responsive to the sensed temperature, e.g. to reduce intensity of the source outputs to compensate for temperature increases.

The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity and leave the device set-up in that manner for an indefinite period. The apparatus also may be controlled dynamically, for example, to vary the color of the white light output and thereby provide special effects lighting. Also, such light settings are easily recorded and reused at a later time or even at a different location using a different system.

The disclosed apparatus may use a variety of different structures or arrangements for the optical integrating cavity. It is desirable that the interior cavity surface have a highly efficient diffusely reflective characteristic, e.g. a reflectivity of over 90%, with respect to the relevant wavelengths. In several examples, the cavity is formed of a diffusely reflective plastic material, such as a polypropylene having a 98% reflectivity and a diffuse reflective characteristic. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity.

A variety of different shapes may be used for the interior reflective surface of the cavity. Although it may be triangular or in the shape of a pyramid, in several examples, the diffusely reflective interior surface of the optical integrating cavity has a shape corresponding to a substantial portion of a sphere (e.g. hemispherical) or a substantial portion of a cylinder (e.g. approximating a half-cylinder). Other examples utilize an extended volume having a rectangular cross-section.

To provide a particular desirable output distribution from the apparatus, it is also possible to construct the cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output characteristic for the system. In examples of the present apparatus using constructive occlusion, the optical integrating cavity would include a base, a mask and a cavity formed in the base or the mask. The mask would have a diffusely reflective surface. The mask is sized and positioned relative to the active area of the system so as to constructively occlude the active area.

In one example of the present apparatus using constructive occlusion, the device would further include a mask outside the optical integrating cavity formed in the base. The mask would have a diffusely reflective surface facing toward the aperture of the cavity. The mask is sized and positioned relative to the aperture so as to constructively occlude the aperture. In another constructive occlusion example, the aperture that serves as the active area is actually a reflection of the interior surface of a dome that forms the curved interior of the cavity. The reflection is formed on a base surface opposite the cavity of the dome. The interior of the cavity is diffusely reflective. In this later arrangement, the dome also serves as the constructive occlusion mask.

The inventive devices have numerous applications, and the output intensity and spectral characteristic may be tailored and/or adjusted to suit the particular application. For example, the intensity of the integrated light emitted through the aperture may be at a level for use in a lumination application or at a level sufficient for a task lighting application. Theater or studio lighting and product display lighting examples are also disclosed.

A lighting system, for providing variable or selectable white lighting for studio or theater applications, includes first and second sources of light of first and second wavelengths. A third source supplies substantially white light. An optical cavity with a diffusely reflective interior surface receives and combines light of the two wavelengths from with the substantially white light, to produce white light of a selected spectral characteristic. The cavity also has an aperture, for allowing emission of resulting white light. The lighting system also includes a variable opening iris optically coupled to the aperture of the optical cavity, for controlling an amount of the light emitted from the aperture directed toward a subject to be illuminated. Control circuitry, coupled to at least the first and second sources, establishes intensity of light from the sources, so as to set a spectral characteristic of the combined white light directed toward the subject to be illuminated in the studio or theater.

In a theater or studio lighting system of this type, the control of the sources controls the spectral characteristic of the emitted white light. As disclosed, adjustment of the size of the opening through the iris in turn controls the intensity of the overall white light output of the system. Disclosed examples of such a system include one or more additional optical processing elements, such as a variable focusing lens system to control the size of the spot illuminated onto the subject.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
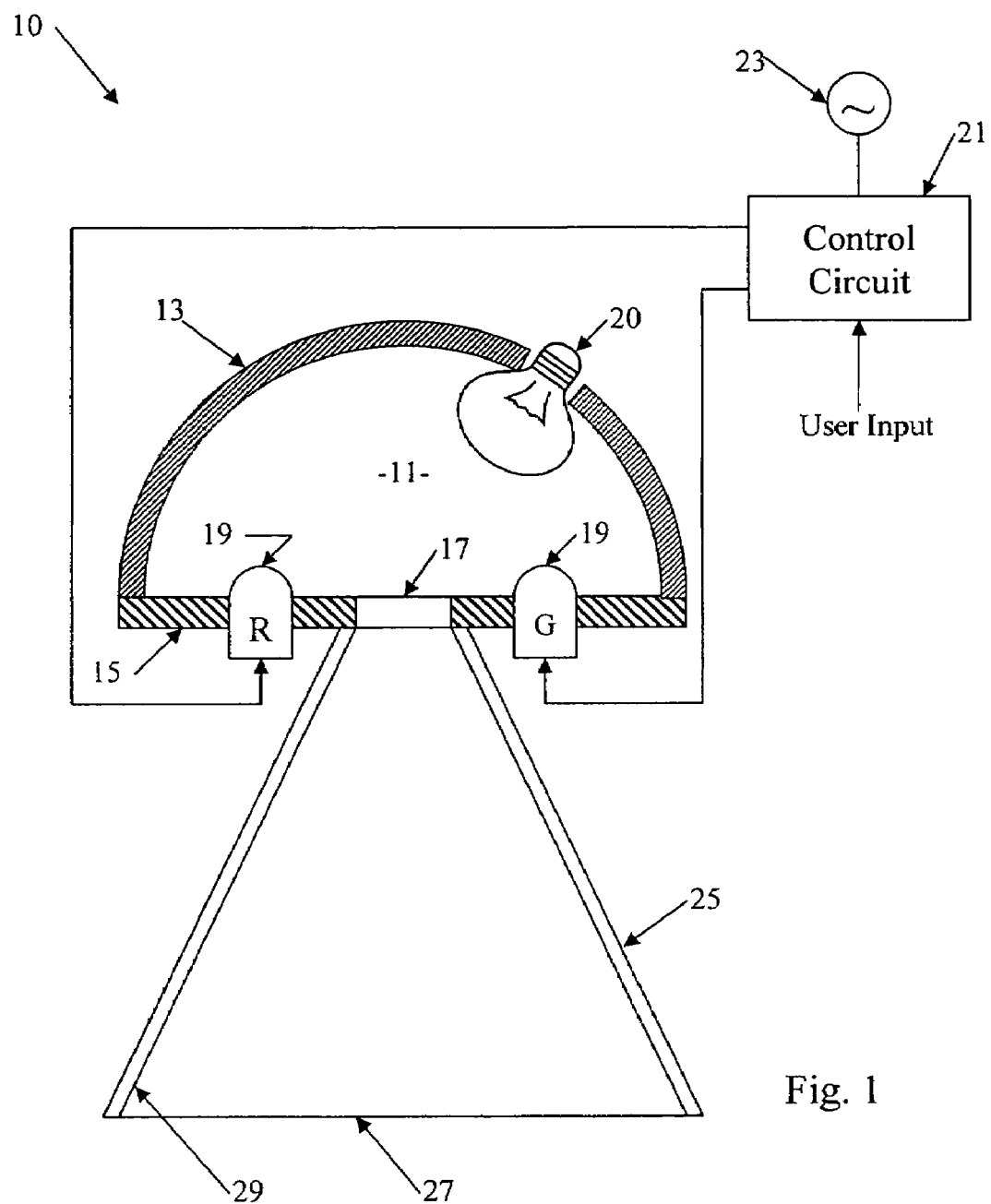
FIG. 1 illustrates an example of a radiant energy emitting system, with certain elements thereof shown in cross-section.

Reference now is made in detail to the examples illustrated in the accompanying drawings and discussed below. FIG. 1 is a cross-sectional illustration of a radiant energy distribution apparatus or system 10. For task lighting applications, the apparatus emits light in the visible spectrum, although the system 10 may be used for rumination applications and/or with emissions in or extending into the infrared and/or ultraviolet portions of the radiant energy spectrum.

The illustrated system 10 includes an optical cavity 11 having a diffusely reflective interior surface, to receive and combine radiant energy of different colors/wavelengths. The cavity 11 may have various shapes. The illustrated cross-section would be substantially the same if the cavity is hemispherical or if the cavity is semi-cylindrical with the cross-section taken perpendicular to the longitudinal axis. The optical cavity in the examples discussed below is typically an optical integrating cavity.

The disclosed apparatus may use a variety of different structures or arrangements for the optical integrating cavity, examples of which are discussed below. At least a substantial portion of the interior surface(s) of the cavity exhibit(s) diffuse reflectivity. It is desirable that the cavity surface have a highly efficient reflective characteristic, e.g. a reflectivity equal to or greater than 90%, with respect to the relevant wavelengths. In the example of FIG. 1, the surface is highly diffusely reflective to energy in the visible, near-infrared, and ultraviolet wavelengths.

The cavity 11 may be formed of a diffusely reflective plastic material, such as a polypropylene having a 97% reflectivity and a diffuse reflective characteristic. Such a highly reflective polypropylene is available from Ferro Corporation—Specialty Plastics Group, Filled and Reinforced Plastics Division, in Evansville, Ind. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity. The coating layer, for example, might take the form of a flat-white paint or white powder coat. A suitable paint might include a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. For more information regarding the exemplary paint, attention is directed to U.S. patent application Ser. No. 09/866,516, which was filed May 29, 2001, by Matthew Brown, which issued as U.S. Pat. No. 6,700,112 on Mar. 2, 2004.

For purposes of the discussion, the cavity 11 in the apparatus 10 is assumed to be hemispherical. In the example, a hemispherical dome 13 and a substantially flat cover plate 15 form the optical cavity 11. At least the interior facing surfaces of the dome 13 and the cover plate 15 are highly diffusely reflective, so that the resulting cavity 11 is highly diffusely reflective with respect to the radiant energy spectrum produced by the device 10. As a result, the cavity 11 is an integrating type optical cavity. Although shown as separate elements, the dome and plate may be formed as an integral unit.

The optical integrating cavity 11 has an aperture 17 for allowing emission of combined light energy. In the example, the aperture 17 is a passage through the approximate center of the cover plate 15, although the aperture may be at any other convenient location on the plate 15 or the dome 13. Because of the diffuse reflectivity within the cavity 11, light within the cavity is integrated before passage out of the aperture 17. In the examples, the apparatus 10 is shown emitting the combined light downward through the aperture 17, for convenience. However, the apparatus 10 may be oriented in any desired direction to perform a desired application function, for example to provide visible luminance to persons in a particular direction or location with respect to the fixture or to illuminate a different surface such as a wall, floor or table top. Also, the optical integrating cavity 11 may have more than one aperture 17, for example, oriented to allow emission of integrated light in two or more different directions or regions.

The apparatus 10 also includes sources of light. In addition to a source 20 of substantially white input light, the apparatus includes two or more sources 19 of light of different wavelengths. In the first example, the sources are LEDs 19, two of which are visible in the illustrated cross-section. The LEDs 19 supply light into the interior of the optical integrating cavity 11. As shown, the points of emission from the LEDs 19 into the interior of the optical integrating cavity 11 are not directly visible through the aperture 17. At least the two illustrated LEDs emit radiant energy of different wavelengths, e.g. Red (R) and Green (G). Additional LEDs of the same or different colors may be provided. The cavity 11 effectively integrates the energy of different light wavelengths with the substantially white light from source 20, so that the integrated or combined light energy emitted through the aperture 17 includes the radiant energy of all the various wavelengths in relative amounts substantially corresponding to the relative intensities of input into the cavity 11.

The source LEDs 19 can include LEDs of any color or wavelength. Typically, an array of LEDs for a visible light application includes at least red, green, and blue LEDs. The integrating or mixing capability of the cavity 11 serves to project light of any color, including white light, by adjusting the intensity of the various sources coupled to the cavity. Hence, it is possible to control color rendering index (CRI), as well as color temperature. The system 10 works with the totality of light output from a family of LEDs 19 to adjust the spectral characteristic of the white light output. However, to provide color adjustment or variability for the white light output, it is not necessary to control the output of individual LEDs 19 or source 20, except as they contribute to the totality. For example, it is not necessary to modulate the source outputs. Also, the distribution pattern of the individual LEDs and their emission points into the cavity are not significant. The LEDs 19 can be arranged in any manner to supply radiant energy within the cavity, although it is preferred that direct view of the LEDs from outside the fixture is minimized or avoided.

In this example, light outputs of the LED sources 19 are coupled directly to openings at points on the interior of the cavity 11, to emit radiant energy directly into the interior of the optical integrating cavity. The LEDs may be located to emit light at points on the interior wall of the element 13, although preferably such points would still be in regions out of the direct line of sight through the aperture 17. For ease of construction, however, the openings for the LEDs 19 are formed through the cover plate 15. On the plate 15, the openings/LEDs may be at any convenient locations.

The source 20 of substantially white input light may be one of the LEDs mounted on the cover plate 15 or at any point on the dome 13. However, the white light source may be any other type of device that produces substantially white light for adjustment or correction by the primary colors from the LEDs 19. Examples of other suitable white light sources 20 include incandescent bulbs, fluorescent bulbs, as well as halide and halogen lamps. Of course, the apparatus may include a number of white light sources 20 of the same or different types, coupled to supply light to the integrating cavity 11.

The intensity of energy from the white light source 20 may be fixed, e.g. by connection to a fixed power supply. Alternatively, the power to the white light source 20 may be controlled by a variable control, similar to or the same as that provided to one or more of the LEDs 19 by the source 23 and the control circuit 21.

The apparatus 10 also includes a control circuit 21 coupled to the LEDs 19 for establishing output intensity of radiant energy of each of the LED sources. The control circuit 21 typically includes a power supply circuit coupled to a source, shown as an AC power source 23. The control circuit 21 also includes an appropriate number of LED driver circuits for controlling the power applied to each of the individual LEDs 19 and thus the intensity of radiant energy supplied to the cavity 11 for each different wavelength. Control of the intensity of emission of the sources sets a spectral characteristic of the combined white light emitted through the aperture 17 of the optical integrating cavity. The control circuit 21 may be responsive to a number of different control input signals, for example, to one or more user inputs as shown by the arrow in FIG. 1. Although not shown in this simple example, feedback may also be provided. Specific examples of the control circuitry are discussed in more detail later.

The aperture 17 may serve as the system output, directing integrated color light to a desired area or region to be illuminated. Although not shown in this example, the aperture 17 may have a grate, lens or diffuser (e.g. a holographic element) to help distribute the output light and/or to close the aperture against entry of moisture of debris. For some applications, the system 10 includes an additional deflector to distribute and/or limit the light output to a desired field of illumination. A later embodiment, for example, uses a collimator.

The color integrating energy distribution apparatus may also utilize one or more conical deflectors having a reflective inner surface, to efficiently direct most of the light emerging from a light source into a relatively narrow field of view. Hence, the exemplary apparatus shown in FIG. 1 also comprises a conical deflector 25. A small opening at a proximal end of the deflector is coupled to the aperture 17 of the optical integrating cavity 11. The deflector 25 has a larger opening 27 at a distal end thereof. The angle and distal opening of the conical deflector 25 define an angular field of light emission from the apparatus 10. Although not shown, the large opening of the deflector may be covered with a transparent plate or lens, or covered with a grating, to prevent entry of dirt or debris through the cone into the system and/or to further process the output radiant energy.

The conical deflector 25 may have a variety of different shapes, depending on the particular lighting application. In the example, where cavity 11 is hemispherical, the cross-section of the conical deflector is typically circular. However, the deflector may be somewhat oval in shape. In applications using a semi-cylindrical cavity, the deflector may be elongated or even rectangular in cross-section. The shape of the aperture 17 also may vary, but will typically match the shape of the small end opening of the deflector 25. Hence, in the example, the aperture 17 would be circular. However, for a device with a semi-cylindrical cavity and a deflector with a rectangular cross-section, the aperture may be rectangular.

The deflector 25 comprises a reflective interior surface 29 between the distal end and the proximal end. In some examples, at least a substantial portion of the reflective interior surface 29 of the conical deflector exhibits specular reflectivity with respect to the integrated radiant energy. As discussed in U.S. Pat. No. 6,007,225, for some applications, it may be desirable to construct the deflector 25 so that at least some portion(s) of the inner surface 29 exhibit diffuse reflectivity or exhibit a different degree of specular reflectivity (e.g., quasi-secular), so as to tailor the performance of the deflector 25 to the particular application. For other applications, it may also be desirable for the entire interior surface 29 of the deflector 25 to have a diffuse reflective characteristic. In such cases, the deflector 25 may be constructed using materials similar to those taught above for construction of the optical integrating cavity 11.

In the illustrated example, the large distal opening 27 of the deflector 25 is roughly the same size as the cavity 11. In some applications, this size relationship may be convenient for construction purposes. However, a direct relationship in size of the distal end of the deflector and the cavity is not required. The large end of the deflector may be larger or smaller than the cavity structure. As a practical matter, the size of the cavity is optimized to provide the integration or combination of light colors from the desired number of LED sources 19 and the white light source 20. The size, angle and shape of the deflector determine the area that will be illuminated by the combined or integrated light emitted from the cavity 11 via the aperture 17.

In the examples, each source of radiant energy of a particular wavelength comprises one or more light emitting diodes (LEDs). Within the chamber, it is possible to process light received from any desirable number of such LEDs. Hence, in several examples, these sources may comprise one or more LEDs for emitting light of a first color, and one or more LEDs for emitting light of a second color, wherein the second color is different from the first color. In a similar fashion, the apparatus may include additional sources comprising one or more LEDs of a third color, a fourth color, etc. To achieve the highest color rendering index (CRI), the LED array may include LEDs of various wavelengths that cover virtually the entire visible spectrum.

Figure 2:
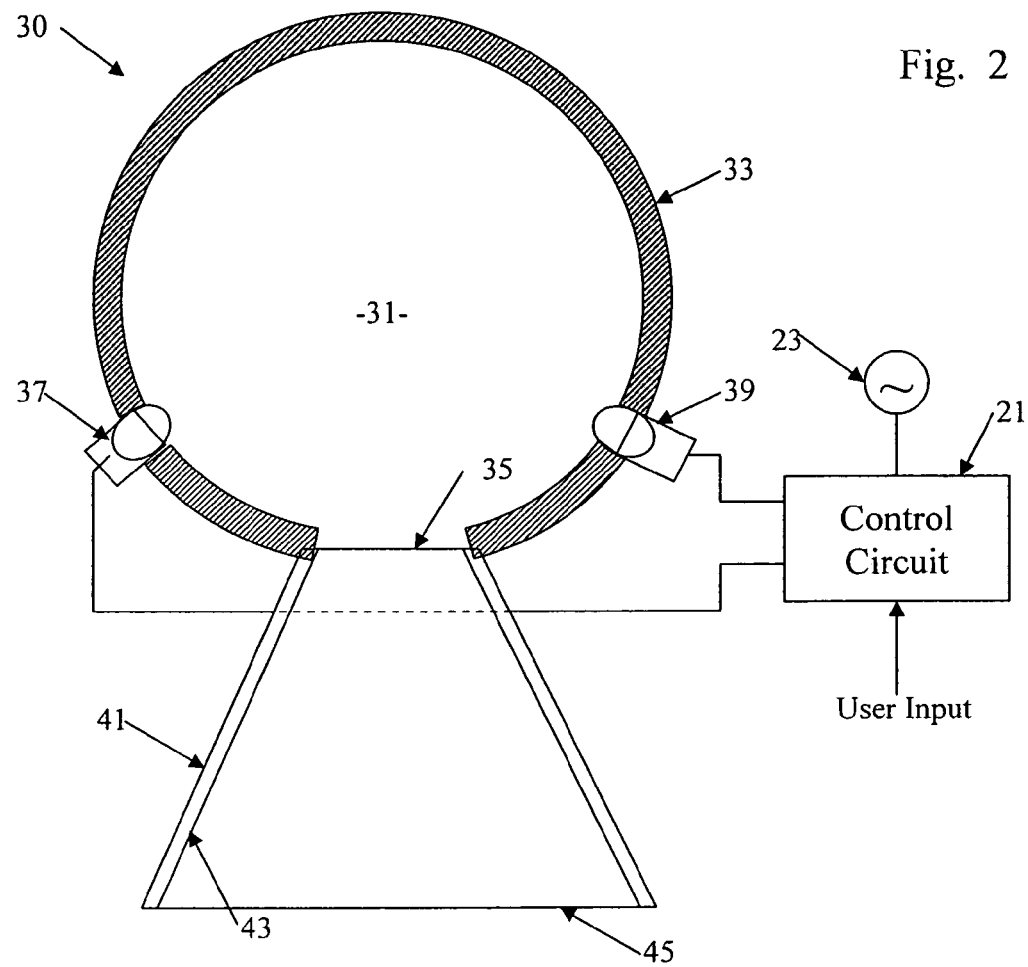
FIG. 2 illustrates another example of a radiant energy emitting system, with certain elements thereof shown in cross-section.
Figure 3:
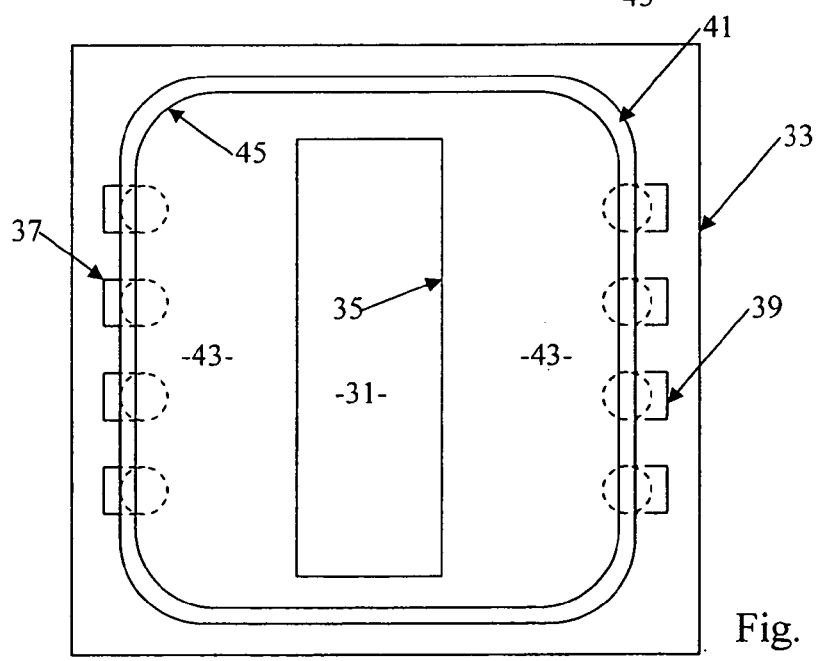
FIG. 3 is a bottom view of the fixture in the system of FIG. 2.
Figure 4:
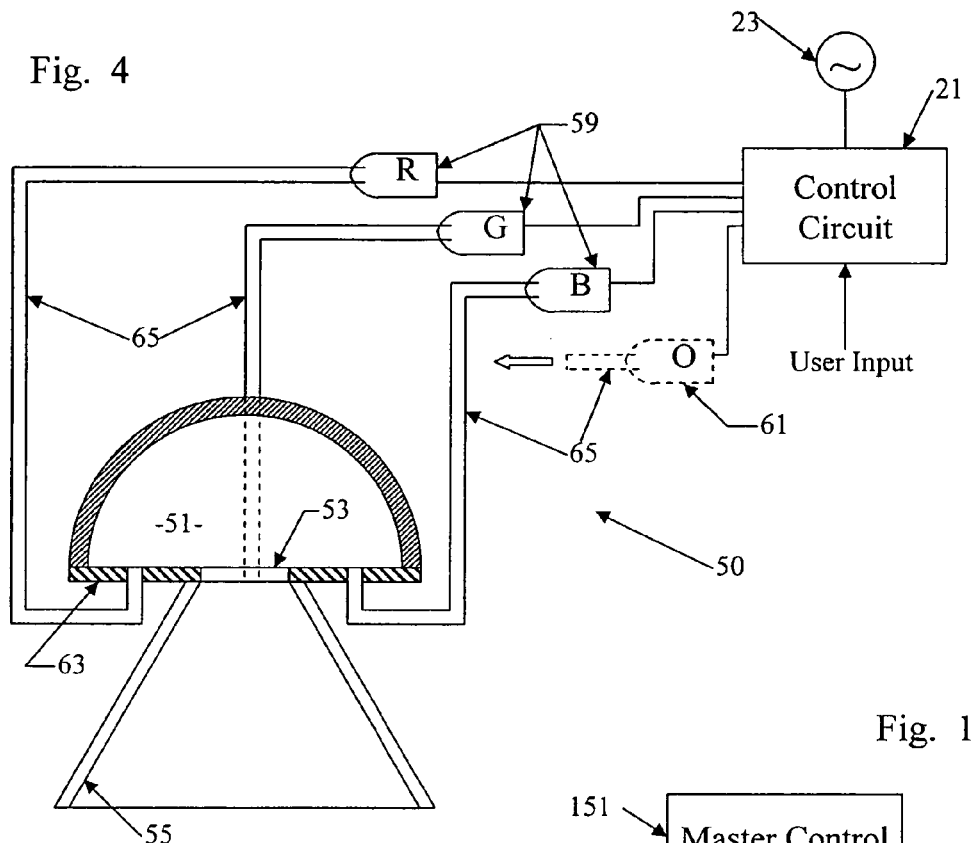
FIG. 4 illustrates another example of a radiant energy emitting system, using fiber optic links from the LEDs to the optical integrating cavity.

FIGS. 2 and 3 illustrate another example of a radiant energy distribution apparatus or system. FIG. 2 shows the overall system 30, including the fixture and the control circuitry. The fixture is shown in cross-section. FIG. 4 is a bottom view of the fixture. The system 30 is generally similar the system 10. For example, the system 30 may utilize essentially the same type of control circuit 21 and power source 23, as in the earlier example. However, the shape of the optical integrating cavity and the deflector are somewhat different.

The optical integrating cavity 31 has a diffusely reflective interior surface. In this example, the cavity 31 has a shape corresponding to a substantial portion of a cylinder. In the cross-sectional view of FIG. 2 (taken across the longitudinal axis of the cavity), the cavity 31 appears to have an almost circular shape. In this example, the cavity 31 is formed by a cylindrical element 33. At least the interior surface of the element 33 is highly diffusely reflective, so that the resulting optical cavity 31 is highly diffusely reflective and functions as an integrating cavity, with respect to the radiant energy spectrum produced by the system 30.

The optical integrating cavity 31 has an aperture 35 for allowing emission of combined radiant energy. In this example, the aperture 35 is a rectangular passage through the wall of the cylindrical element 33. Because of the diffuse reflectivity within the cavity 31, light within the cavity is integrated before passage out of the aperture 35.

The apparatus 30 also includes sources of light energy of different wavelengths and of a substantially white light. In this example, the sources comprise LEDs 37, 39. The LEDs are mounted in openings through the wall of the cylindrical element 33, to essentially form two rows of LEDs on opposite sides of the aperture 35. The positions of these openings, and thus the positions of the LEDs 37 and 39, typically are such that the LED outputs are not directly visible through the aperture 35, otherwise the locations are a matter of arbitrary choice.

Thus, the LEDs 37 and 39 supply radiant energy into the interior of the optical integrating cavity 31, through openings at points on the interior surface of the optical integrating cavity not directly visible through the aperture 35. A number of the LEDs emit radiant energy of different wavelengths, and at least one of the LEDs emits substantially white light. For example, arbitrary pairs of the LEDs 37, 39 might emit three different colors of light, e.g. Red, Green and Blue as primary colors. One or more white light sources, e.g. white LEDs, also are provided to supply the substantially white input light.

Alternatively, a number of the LEDs may be initially active LEDs, whereas others are initially inactive sleeper LEDs. For example, the initially active LEDs might include two white LEDs, a Red LED, a Green LED and a Blue LED; and the sleeper LEDs might include one Red LED, one Green LED and one Blue LED. Although not shown, an additional white LED also could be provided, as a sleeper.

The control circuit 21 controls the power provided to each of the LEDs 37 and 39. The cavity 31 effectively integrates the energy of the substantially white input light and energy of the different light wavelengths, from the various LEDs 37 and 39, so that the integrated light energy emitted through the aperture 35 includes the radiant energy of all the various wavelengths. Control of the intensity of emission of the sources, by the control circuit 21, sets a spectral characteristic of the combined light energy emitted through the aperture 35. If sleeper LEDs are provided, the control also activates one or more dormant LEDs, on an "as-needed" basis, when extra white output or extra output of a particular wavelength or color is required.

The color integrating energy distribution apparatus 30 may also include a deflector 41 having a specular reflective inner surface 43, to efficiently direct most of the light emerging from the aperture into a relatively narrow field of view. The deflector 41 expands outward from a small end thereof coupled to the aperture 35. The deflector 41 has a larger opening 45 at a distal end thereof. The angle of the side walls of the deflector and the shape of the distal opening 45 of the deflector 41 define an angular field of radiant energy emission from the apparatus 30.

As noted above, the deflector may have a variety of different shapes, depending on the particular lighting application. In the example, where the cavity 31 is substantially cylindrical, and the aperture is rectangular, the cross-section of the deflector 41 (viewed across the longitudinal axis as in FIG. 3) typically appears conical, since the deflector expands outward as it extends away from the aperture 35. However, when viewed on-end (bottom view—FIG. 4), the openings are substantially rectangular, although they may have somewhat rounded corners. Alternatively, the deflector 41 may be somewhat oval in shape. The shapes of the cavity and the aperture may vary, for example, to have rounded ends, and the deflector may be contoured to match the aperture.

The deflector 41 comprises a reflective interior surface 43 between the distal end and the proximal end. In several examples, at least a substantial portion of the reflective interior surface 43 of the conical deflector exhibits specular reflectivity with respect to the combined radiant energy, although different reflectivity may be provided, as noted in the discussion of FIG. 1.

If provided, "sleeper" LEDs would be activated only when needed to maintain the light output, color, color temperature, and/or thermal temperature. As discussed later with regard to an exemplary control circuit, the system 30 could have a color sensor coupled to provide feedback to the control circuit 21. The sensor could be within the cavity or the deflector or at an outside point illuminated by the integrated light from the fixture.

As LEDs age, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

In the examples discussed above relative to FIG. 1 to 3, the LED sources were coupled directly to openings at the points on the interior of the cavity, to emit radiant energy directly into the interior of the optical integrating cavity. It is also envisioned that the sources may be somewhat separated from the cavity, in which case, the device might include optical fibers or other forms of light guides coupled between the sources and the optical integrating cavity, to supply radiant energy from the sources to the emission points into the interior of the cavity. FIG. 4 depicts such a system 50, which uses optical fibers.

The system 50 includes an optical integrating cavity 51, an aperture 53 and a deflector with a reflective interior surface 55, similar to those in the earlier embodiments. The interior surface of the optical integrating cavity 51 is highly diffusely reflective, whereas the deflector surface 55 exhibits a specular reflectivity.

The system 50 includes a control circuit 21 and power source 23, as in the earlier embodiments. In the system 50, the radiant energy sources comprise LEDs 59 of three different wavelengths, e.g. to provide Red, Green and Blue light respectively. The sources also include one or more additional LEDs 61, including a white LED and possibly including LEDs of a different additional color or for use as 'sleepers,' similar to the example of FIGS. 2 and 3. In this example (FIG. 6), the cover plate 63 of the cavity 51 has openings into which are fitted the light emitting distal ends of optical fibers 65. The proximal light receiving ends of the fibers 65 are coupled to receive light emitted by the LEDs 59 (and 61 if provided). In this way, the LED sources 59, 61 may be separate from the chamber 51, for example, to allow easier and more effective dissipation of heat from the LEDs. The fibers 65 transport the light from the LED sources 59, 61 to the cavity 51. The cavity 51 integrates the different colors of light from the LEDs as in the earlier examples and supplies combined light, that is to say white light of the selected spectral characteristic, out through the aperture 53. The deflector, in turn, directs the combined light to a desired field. Again, the intensity control by the circuit 21 adjusts the amount or intensity of the light of each type provided by the LED sources and thus controls the spectral characteristic of the combined white light output.

A number of different examples of control circuits are discussed below. In one example, the control circuitry comprises a color sensor coupled to detect color distribution in the integrated radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the integrated white light energy.

To provide a uniform output distribution from the apparatus, it is also possible to construct the optical cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output performance characteristic for the system. In examples of the present systems using constructive occlusion, the optical integrating cavity comprises a base, a mask and a cavity in either the base or the mask. The mask would have a diffusely reflective surface facing toward the aperture. The mask is sized and positioned relative to the active area so as to constructively occlude the active area. It may be helpful to consider two examples using constructive occlusion.

Figure 5:
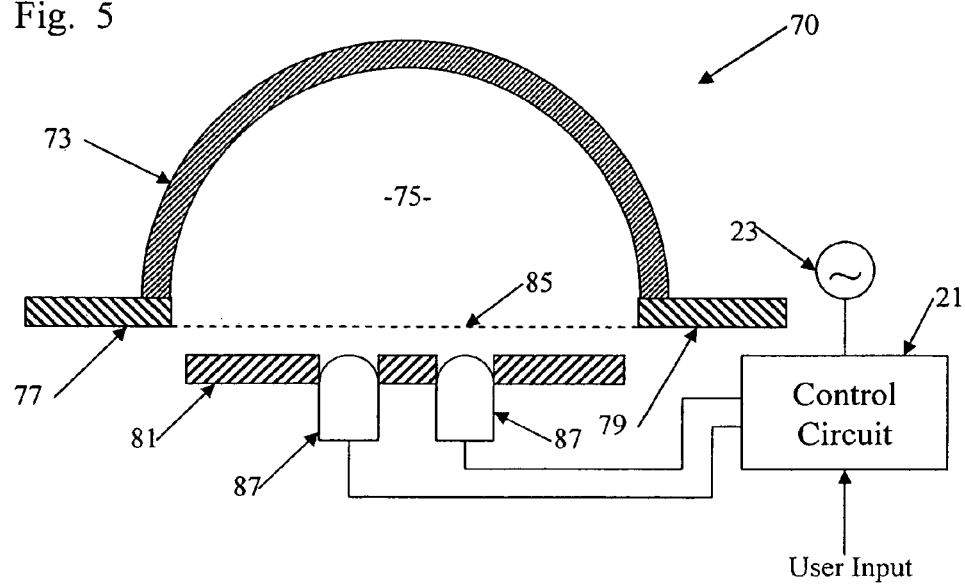
FIG. 5 illustrates another example of a radiant energy emitting system, utilizing principles of constructive occlusion.
Figure 6:
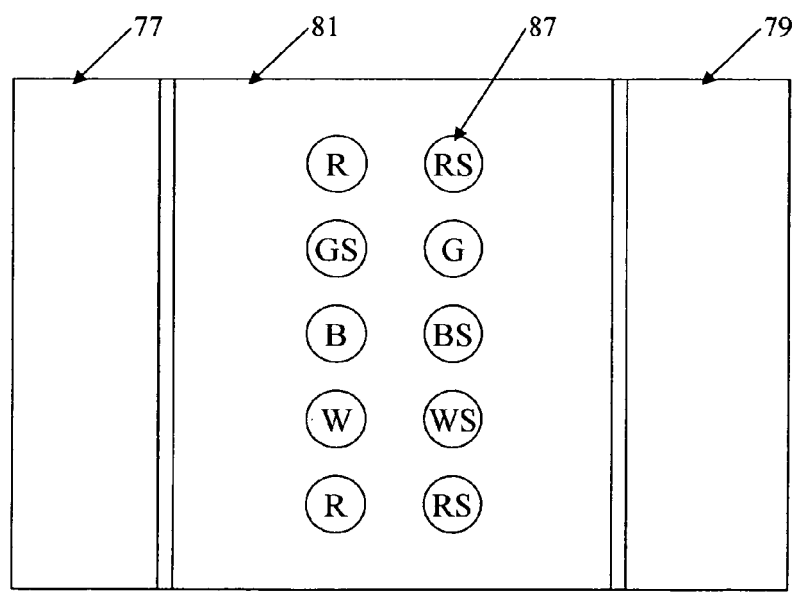
FIG. 6 is a bottom view of the fixture in the system of FIG. 5.

FIGS. 5 and 6 depict a first, simple embodiment of a light distributor apparatus or system 70, for projecting integrated multi-wavelength light with a tailored intensity distribution, using the principles of constructive occlusion. In the cross-section illustration, the system 70 is oriented to provide downward illumination. Such a system might be mounted in or suspended from a ceiling or canopy or the like. Those skilled in the art will recognize that the designer may choose to orient the system 70 in different directions, to adapt the system to other lighting applications.

The lighting system 70 includes a base 73, having or forming a cavity 75, and adjacent shoulders 77 and 79, constructed in a manner similar to the elements forming integrating cavities in the earlier examples. In particular, the interior of the cavity 75 is diffusely reflective, and the down-facing surfaces of shoulders 77 and 79 may be reflective. If the shoulder surfaces are reflective, they may be specular or diffusely reflective. A mask 81 is disposed between the cavity aperture 85 and the field to be illuminated. In this symmetrical embodiment, the interior wall of a half-cylindrical base 73 forms the cavity; therefore the aperture 85 is rectangular. The shoulders 77 formed along the sides of the aperture 85 are rectangular. If the base were circular, with a hemispherical cavity, the shoulders typically would form a ring that may partially or completely surround the aperture.

In many constructive occlusion embodiments, the cavity 75 comprises a substantial segment of a sphere. For example, the cavity may be substantially hemispherical, as in earlier examples. However, the cavity's shape is not of critical importance. A variety of other shapes may be used. In the illustrated example, the half-cylindrical cavity 75 has a rectangular aperture, and if extended longitudinally, the rectangular aperture may approach a nearly linear aperture (slit). Practically any cavity shape is effective, so long as it has a diffuse reflective inner surface. A hemisphere or the illustrated half-cylinder shape are preferred for the ease in modeling for the light output toward the field of intended illumination and the attendant ease of manufacture. Also, sharp corners tend to trap some reflected energy and reduce output efficiency.

For purposes of constructive occlusion, the base 73 may be considered to have an active optical area, preferably exhibiting a substantially Lambertian energy distribution. Where the cavity is formed in the base, for example, the planar aperture 85 formed by the rim or perimeter of the cavity 75 forms the active surface with substantially Lambertian distribution of energy emerging through the aperture. As shown in a later embodiment, the cavity may be formed in the facing surface of the mask. In such a system, the surface of the base may be a diffusely reflective surface, therefore the active area on the base would essentially be the mirror image of the cavity aperture on the base surface, that is to say the area reflecting energy emerging from the physical aperture of the cavity in the mask.

The mask 81 constructively occludes a portion of the optically active area of the base with respect to the field of intended illumination. In the example of FIG. 5, the optically active area is the aperture 85 of the cavity 75; therefore the mask 81 occludes a substantial portion of the aperture 85, including the portion of the aperture on and about the axis of the mask and cavity system. The surface of the mask 81 facing towards the aperture 85 is reflective. Although it may be specular, typically this surface is diffusely reflective.

The relative dimensions of the mask 81 and aperture 85, for example the relative widths (or diameters or radii in a more circular system) as well as the distance of the mask 81 away from the aperture 85, control the constructive occlusion performance characteristics of the lighting system 70. Certain combinations of these parameters produce a relatively uniform emission intensity with respect to angles of emission, over a wide portion of the field of view about the system axis (vertically downward in FIG. 5), covered principally by the constructive occlusion. Other combinations of size and height result in a system performance that is uniform with respect to a wide planar surface perpendicular to the system axis at a fixed distance from the active area.

The shoulders 77, 79 also are reflective and therefore deflect at least some light downward. The shoulders (and side surfaces of the mask) provide additional optical processing of combined light from the cavity. The angles of the shoulders and the reflectivity of the surfaces thereof facing toward the region to be illuminated by constructive occlusion also contribute to the intensity distribution over that region. In the illustrated example, the reflective shoulders are horizontal, although they may be angled somewhat downward from the plane of the aperture.

With respect to the light energy of the wavelengths processed by the system, the interior space formed between the cavity 75 and the facing surface of the mask 81 operates as an optical integrating cavity, in essentially the same manner as the integrating cavities in the previous embodiments. Again, the LEDs 87 provide light of a number of different colors, and thus of different wavelengths. At least one of the LEDs also provides substantially white light. The optical cavity combines the light of multiple colors supplied from the LEDs 87. The control circuit 21 controls the amount of each color of light supplied to the chamber and thus the proportion thereof included in the combined output light. The constructive occlusion serves to distribute that light in a desired manner over a field or area that the system 70 is intended to illuminate, with a tailored intensity distribution.

The LEDs 87 could be located at (or coupled by optical fiber to emit light) from any location or part of the surface of the cavity 75. Preferably, the LED outputs are not directly visible through the un-occluded portions of the aperture 85 (between the mask and the edge of the cavity). In examples of the type shown in FIGS. 5 and 6, the easiest way to so position the LED outputs is to mount the LEDs 87 (or provide fibers or the like) so as to supply light to the chamber through openings through the mask 81.

FIG. 6 also provides an example of an arrangement of the LEDs in which there are both active and inactive (sleeper) LEDs of the various colors. As shown, the active part of the array of LEDs 87 includes two Red LEDs (R), one Green LED (G) and one Blue LED (B). The initially inactive part of the array of LEDs 87 includes two Red sleeper LEDs (RS), one Green sleeper LED (GS) and one Blue sleeper LED (BS). The system includes an active white LED (W) and a sleeper LED (WS) for providing the substantially white input light on an as-needed basis. If other wavelengths or white light sources are desired, the apparatus may include an active LED of the other color as well as a sleeper LED of the other color. The precise number, type, arrangement and mounting technique of the LEDs and the associated ports through the mask 81 are not critical. The number of LEDs, for example, is chosen to provide a desired level of output energy (intensity), for a given application.

The system 70 includes a control circuit 21 and power source 23. These elements control the operation and output intensity of each LED 87. The individual intensities determine the amount of each color light included in the integrated and distributed output. The control circuit 21 functions in essentially the same manner as in the other examples.

Figure 8:
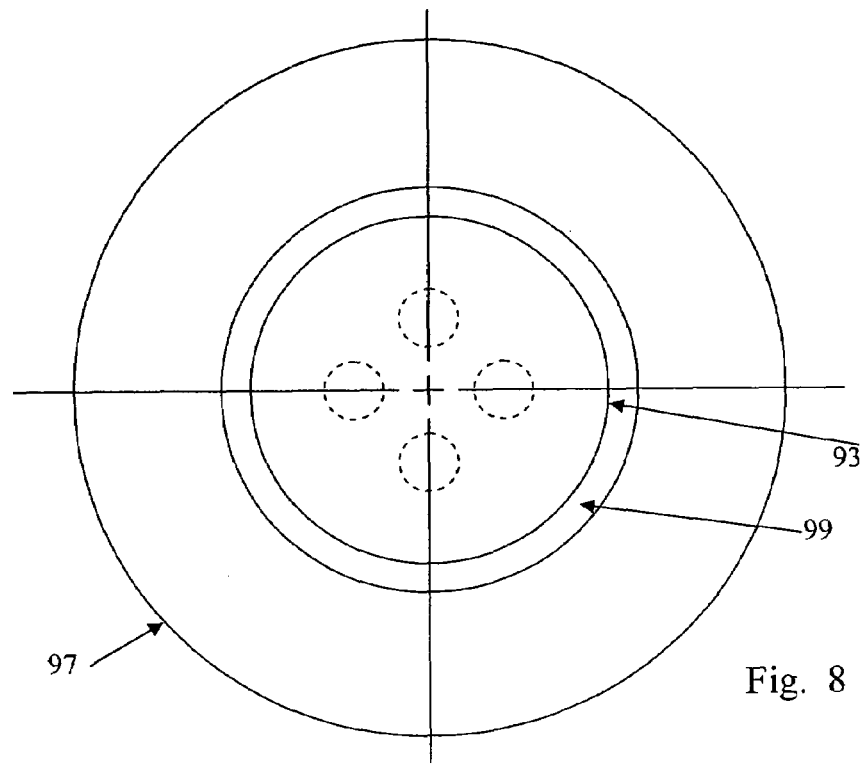
FIG. 8 is a top plan view of the fixture in the system of FIG. 7.
Figure 7:
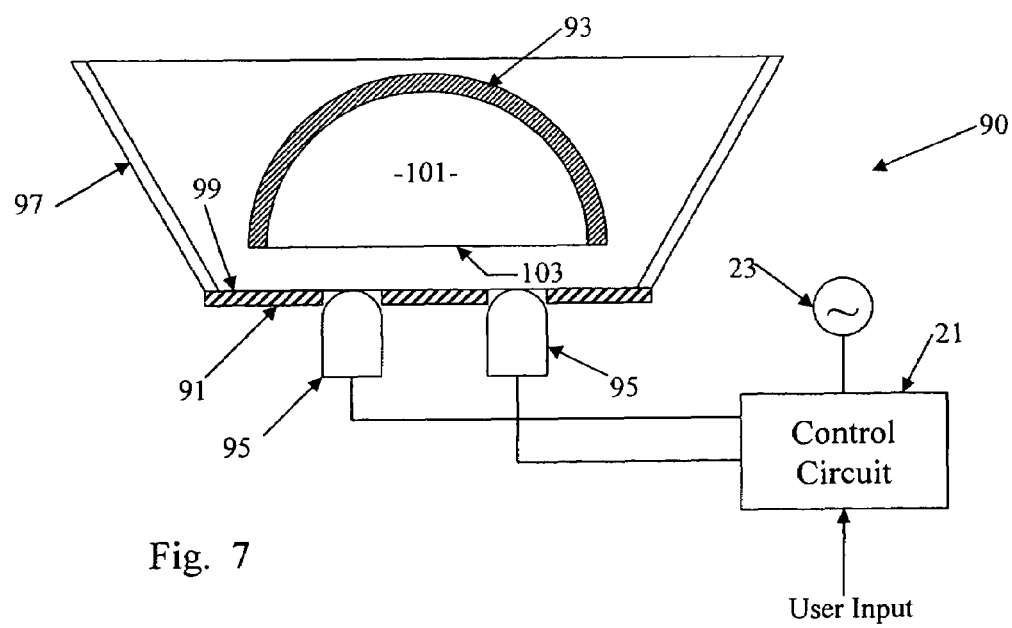
FIG. 7 illustrates an alternate example of a radiant energy emitting system, utilizing principles of constructive occlusion.

FIGS. 7 and 8 illustrate a second constructive occlusion example. In this example, the physical cavity is actually formed in the mask, and the active area of the base is a flat reflective panel of the base.

The illustrated system 90 comprises a flat base panel 91, a mask 93, LED light sources 95, and a conical deflector 97. The system 90 is circularly symmetrical about a vertical axis, although it could be rectangular or have other shapes. The base 91 includes a flat central region 99 between the walls of the deflector 97. The region 99 is reflective and forms or contains the active optical area on the base facing toward the region or area to be illuminated by the system 90.

The mask 93 is positioned between the base 91 and the region to be illuminated by constructive occlusion. For example, in the orientation shown, the mask 93 is above the active optical area 99 of the base 91, for example to direct light toward a ceiling for indirect illumination. Of course the mask and cavity system could be inverted to serve as a downlight for task lighting applications, or the mask and cavity system could be oriented to emit light in directions appropriate for other applications.

In this example, the mask 93 contains the diffusely reflective cavity 101, constructed in a manner similar to the integrating cavities in the earlier examples. The physical aperture 103 of the cavity 101 and of any diffusely reflective surface(s) of the mask 93 that may surround that aperture form an active optical area on the mask 93. Such an active area on the mask faces away from the region to be illuminated and toward the active surface 99 on the base 91. The surface 99 is reflective, preferably with a diffuse characteristic. The surface 99 of the base 91 essentially acts to produce a diffused mirror image of the mask 93 with its cavity 101 as projected onto the base area 99. The reflection formed by the active area of the base becomes the effective aperture of the optical integrating cavity (between the mask and base) when the fixture is considered from the perspective of the area of intended illumination. The surface area 99 reflects energy emerging from the aperture 103 of the cavity 101 in the mask 93. The mask 93 in turn constructively occludes light diffused from the active base surface 99 with respect to the region illuminated by the system 90. The dimensions and relative positions of the mask and active region on the base control the performance of the system, in essentially the same manner as in the mask and cavity system of FIGS. 6 and 7.

The system 90 includes a control circuit 21 and associated power source 23, for supplying controlled electrical power to the LED sources 95. In this example, the LEDs emit light through openings through the base 91, preferably at points not directly visible from outside the system. The LEDs 95 supply substantially white light as well as various wavelengths of primary color light, and the circuit 21 controls the power of each LED, to control the amount of each color of light in the combined output, as discussed above relative to the other examples.

The base 91 could have a flat ring-shaped shoulder with a reflective surface. In this example, however, the shoulder is angled toward the desired field of illumination to form a conical deflector 97. The inner surface of the deflector 97 is reflective, as in the earlier examples.

The deflector 97 has the shape of a truncated cone, in this example, with a circular lateral cross section. The cone has two circular openings. The cone tapers from the large end opening to the narrow end opening, which is coupled to the active area 99 of the base 91. The narrow end of the deflector cone receives light from the surface 99 and thus from diffuse reflections between the base and the mask.

The entire area of the inner surface of the cone 97 is reflective. At least a portion of the reflective surface is specular, as in the deflectors of the earlier examples. The angle of the wall(s) of the conical deflector 97 substantially corresponds to the angle of the desired field of view of the illumination intended for the system 90. Because of the reflectivity of the wall of the cone 97, most if not all of the light reflected by the inner surface thereof would at least achieve an angle that keeps the light within the field of view.

Several of the LED light sources 95 emit multiple wavelengths of light into the mask cavity 101, and at least one LED emits substantially white light. The light sources 95 may direct some light toward the inner surface of the deflector 97. Light rays impacting on the diffusely reflective surfaces, particularly those on the inner surface of the cavity 101 and the facing surface 99 of the base 91, reflect and diffuse one or more times within the confines of the system and emerge through the gap between the perimeter of the active area 99 of the base and the outer edge of the mask 93. The mask cavity 101 and the base surface 99 function as an optical integrating cavity with respect to the light of various wavelengths and the substantially white light, and the gap becomes the actual integrating cavity aperture from which adjusted white light of the selected spectral characteristic emerges. The white light emitted through the gap and/or reflected from the surface of the inner surface of the deflector 97 irradiates a region (upward in the illustrated orientation) with a desired intensity distribution and with a desired spectral characteristic, essentially as in the earlier examples.

Additional information regarding constructive occlusion based systems for generating and distributing radiant energy may be found in commonly assigned U.S. Pat. Nos. 6,342,695, 6,334,700, 6,286,979, 6,266,136 and 6,238,077. The color integration principles discussed herein may be adapted to any of the constructive occlusion devices discussed in those patents.

The inventive devices have numerous applications, and the output intensity and spectral characteristic may be tailored and/or adjusted to suit the particular application. For example, the intensity of the integrated white light emitted through the aperture may be at a level for use in a lumination application or at a level sufficient for a task lighting application. A number of other control circuit features also may be implemented. For example, the control may maintain a set color characteristic in response to feedback from a color sensor. The control circuitry may also include a temperature sensor. In such an example, the logic circuitry is also responsive to the sensed temperature, e.g. to reduce intensity of the source outputs to compensate for temperature increases. The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity, and leave the device set-up in that manner for an indefinite period. The apparatus also may be controlled dynamically, for example, to provide special effects lighting. Also, such light settings are easily recorded and reused at a later time or even at a different location using a different system.

To appreciate the features and examples of the control circuitry outlined above, it may be helpful to consider specific examples with reference to appropriate diagrams.

Figure 9:
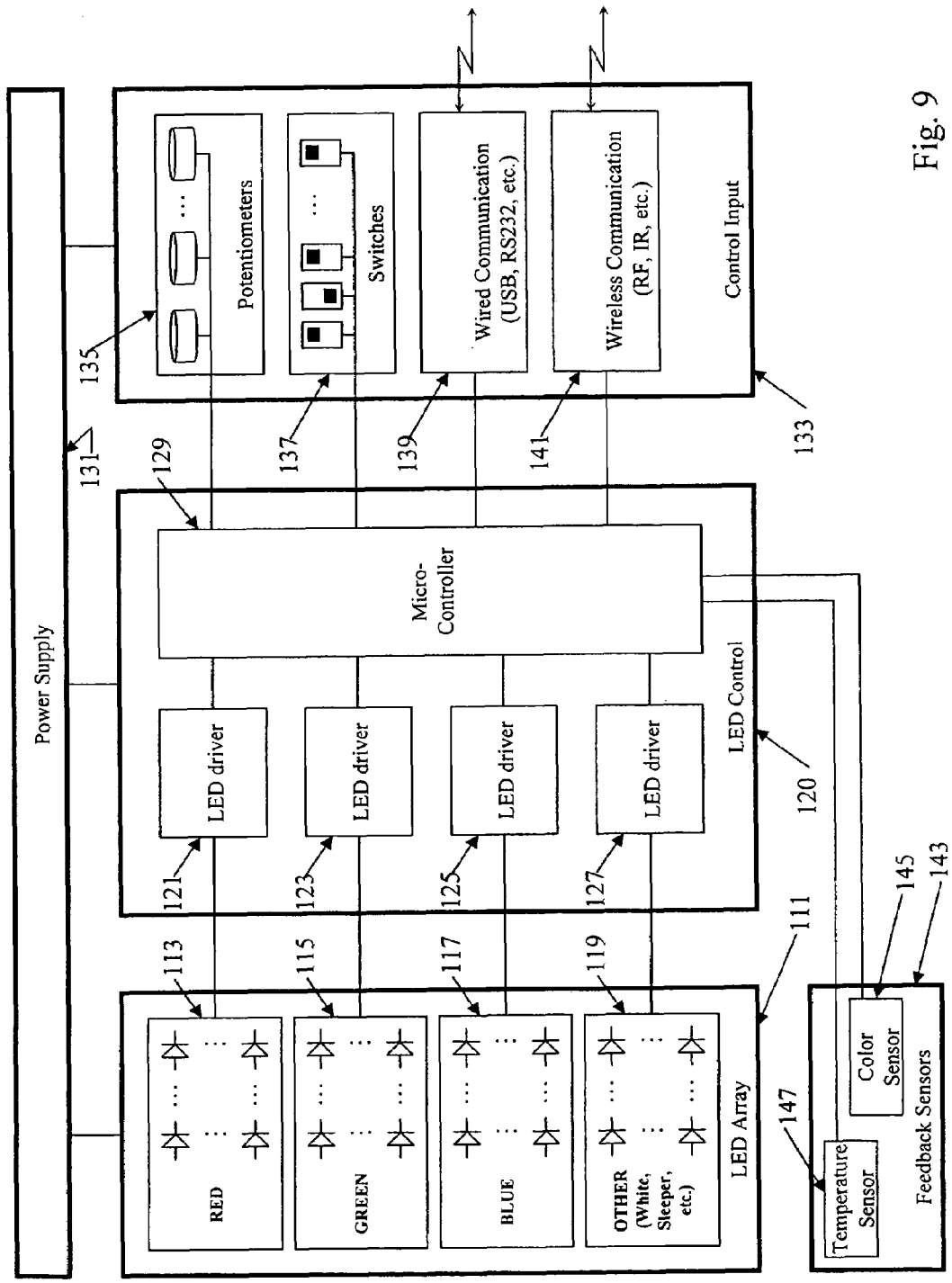
FIG. 9 is a functional block diagram of the electrical components, of one of the radiant energy emitting systems, using programmable digital control logic.

FIG. 9 is a block diagram of exemplary circuitry for the sources and associated control circuit, providing digital programmable control, which may be utilized with a light integrating fixture of the type described above. In this circuit example, the sources of radiant energy of the various types takes the form of an LED array 111. The array 111 comprises two or more LEDs of each of the three primary colors, red green and blue, represented by LED blocks 113, 115 and 117. For example, the array may comprise six red LEDs 113, three green LEDs 115 and three blue LEDs 117.

The LED array in this example also includes a number of additional or "other" LEDs 119. The additional LEDs include one or more 'white' LEDs, as the source of substantially white input light. The primary colors LEDs provide light for selectable color adjustment and/or correction.

There are several other types of additional LEDs that may be of interest in the present discussion. One type of additional LED provides one or more additional wavelengths of radiant energy for integration within the chamber. The additional wavelengths may be in the visible portion of the light spectrum, to allow a greater degree of color adjustment. Alternatively, the additional wavelength LEDs may provide energy in one or more wavelengths outside the visible spectrum, for example, in the infrared range or the ultraviolet range.

The second type of additional LED that may be included in the system is a sleeper LED. As discussed above, some LEDs would be active, whereas the sleepers would be inactive, at least during initial operation. Using the circuitry of FIG. 10 as an example, the Red LEDs 113, Green LEDs 115 and Blue LEDs 117 might normally be active. One or more of the LEDs 119 would be sleeper LEDs, typically including one or more LEDs of each color used in the particular system and possibly one or more white LEDs.

Figure 10:
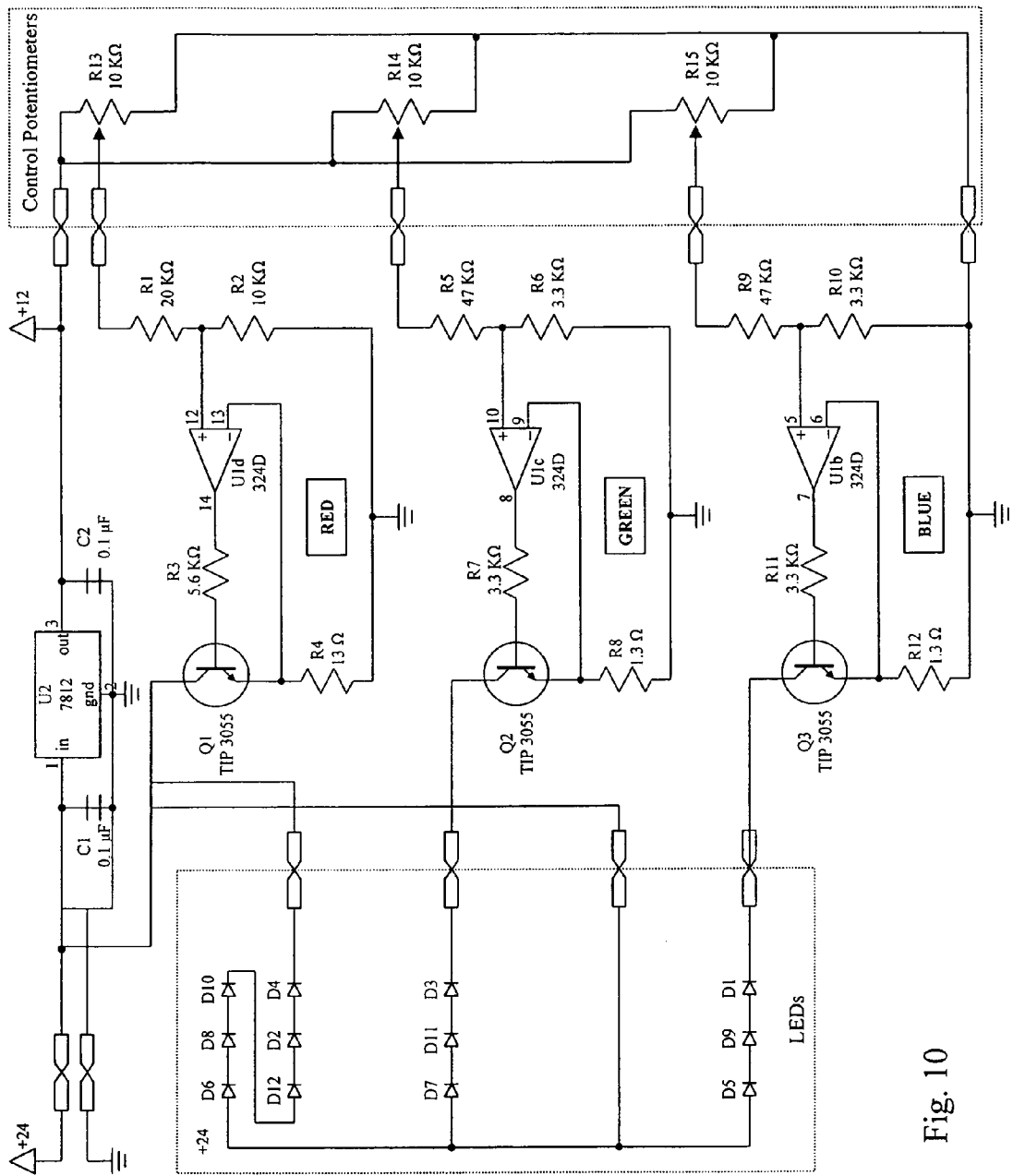
FIG. 10 is a circuit diagram showing the electrical components, of one of the radiant energy emitting systems, using analog control circuitry to control the LED sources for adjustment of the spectral characteristic of the combined white light output.

The electrical components shown in FIG. 10 also include an LED control system 120. The system 120 includes driver circuits for the various LEDs and a microcontroller. The driver circuits supply electrical current to the respective LEDs 113 to 119 to cause the LEDs to emit light. The driver circuit 121 drives the Red LEDs 113, the driver circuit 123 drives the green LEDs 115, and the driver circuit 125 drives the Blue LEDs 117. In a similar fashion, when active, the driver circuit 127 provides electrical current to the other LEDs 119. If the other LEDs provide another color of light, and are connected in series, there may be a single driver circuit 127. If the LEDs are sleepers, it may be desirable to provide a separate driver circuit 127 for each of the LEDs 119. The intensity of the emitted light of a given LED is proportional to the level of current supplied by the respective driver circuit.

The current output of each driver circuit is controlled by the higher level logic of the system. In this digital control example, that logic is implemented by a programmable microcontroller 129, although those skilled in the art will recognize that the logic could take other forms, such as discrete logic components, an application specific integrated circuit (ASIC), etc.

The LED driver circuits and the microcontroller 129 receive power from a power supply 131, which is connected to an appropriate power source (not separately shown). For most task-lighting applications, the power source will be an AC line current source, however, some applications may utilize DC power from a battery or the like. The power supply 129 converts the voltage and current from the source to the levels needed by the driver circuits 121-127 and the microcontroller 129.

A programmable microcontroller typically includes or has coupled thereto random-access memory (RAM) for storing data and read-only memory (ROM) and/or electrically erasable read only memory (EEROM) for storing control programming and any pre-defined operational parameters, such as pre-established light 'recipes.' The microcontroller 129 itself comprises registers and other components for implementing a central processing unit (CPU) and possibly an associated arithmetic logic unit. The CPU implements the program to process data in the desired manner and thereby generate desired control outputs.

The microcontroller 129 is programmed to control the LED driver circuits 121-127 to set the individual output intensities of the LEDs to desired levels, so that the combined white light emitted from the aperture of the cavity has a desired spectral characteristic and a desired overall intensity. The microcontroller 129 may be programmed to essentially establish and maintain or preset a desired 'recipe' or mixture of the available wavelengths provided by the LEDs used in the particular system. The microcontroller 129 receives control inputs specifying the particular 'recipe' or mixture, as will be discussed below. To insure that the desired mixture is maintained, the microcontroller receives a color feedback signal from an appropriate color sensor. The microcontroller may also be responsive to a feedback signal from a temperature sensor, for example, in or near the optical integrating cavity.

The electrical system will also include one or more control inputs 133 for inputting information instructing the microcontroller 129 as to the desired operational settings. A number of different types of inputs may be used and several alternatives are illustrated for convenience. A given installation may include a selected one or more of the illustrated control input mechanisms.

As one example, user inputs may take the form of a number of potentiometers 135. The number would typically correspond to the number of different light wavelengths provided by the particular LED array 111. The potentiometers 135 typically connect through one or more analog to digital conversion interfaces provided by the microcontroller 129 (or in associated circuitry). To set the parameters for the integrated light output, the user adjusts the potentiometers 135 to set the intensity for each color. The microcontroller 129 senses the input settings and controls the LED driver circuits accordingly, to set corresponding intensity levels for the LEDs providing the light of the various wavelengths.

Another user input implementation might utilize one or more dip switches 137. For example, there might be a series of such switches to input a code corresponding to one of a number of recipes. The memory used by the microcontroller 129 would store the necessary intensity levels for the different color LEDs in the array 111 for each recipe. Based on the input code, the microcontroller 129 retrieves the appropriate recipe from memory. Then, the microcontroller 129 controls the LED driver circuits 121-127 accordingly, to set corresponding intensity levels for the LEDs 113-119 providing the light of the various wavelengths.

As an alternative or in addition to the user input in the form of potentiometers 135 or dip switches 137, the microcontroller 129 may be responsive to control data supplied from a separate source or a remote source. For that purpose, some versions of the system will include one or more communication interfaces. One example of a general class of such interfaces is a wired interface 139. One type of wired interface typically enables communications to and/or from a personal computer or the like, typically within the premises in which the fixture operates. Examples of such local wired interfaces include USB, RS-232, and wire-type local area network (LAN) interfaces. Other wired interfaces, such as appropriate modems, might enable cable or telephone line communications with a remote computer, typically outside the premises. Other examples of data interfaces provide wireless communications, as represented by the interface 141 in the drawing. Wireless interfaces, for example, use radio frequency (RF) or infrared (IR) links. The wireless communications may be local on-premises communications, analogous to a wireless local area network (WLAN). Alternatively, the wireless communications may enable communication with a remote device outside the premises, using wireless links to a wide area network.

As noted above, the electrical components may also include one or more feedback sensors 143, to provide system performance measurements as feedback signals to the control logic, implemented in this example by the microcontroller 129. A variety of different sensors may be used, alone or in combination, for different applications. In the illustrated example, the set 143 of feedback sensors includes a color sensor 145 and a temperature sensor 147. Although not shown, other sensors, such as an overall intensity sensor may be used. The sensors are positioned in or around the system to measure the appropriate physical condition, e.g. temperature, color, intensity, etc.

The color sensor 145, for example, is coupled to detect color distribution in the integrated radiant energy. The color sensor may be coupled to sense energy within the optical integrating cavity, within the deflector (if provided) or at a point in the field illuminated by the particular system. Various examples of appropriate color sensors are known. For example, the color sensor may be a digital compatible sensor, of the type sold by TAOS, Inc. Another suitable sensor might use the quadrant light detector disclosed in U.S. Pat. No. 5,877,490, with appropriate color separation on the various light detector elements (see U.S. Pat. No. 5,914,487 for discussion of the color analysis).

The associated logic circuitry, responsive to the detected color distribution, controls the output intensity of the various LEDs, so as to provide a desired color distribution in the integrated white light energy, in accord with appropriate settings. In an example using sleeper LEDs, the logic circuitry is responsive to the detected color distribution to selectively activate the inactive light emitting diodes as needed, to maintain the desired color distribution in the integrated light energy. The color sensor measures the color of the integrated white light energy produced by the system and provides a color measurement signal to the microcontroller 129. If using the TAOS, Inc. color sensor, for example, the signal is a digital signal derived from a color to frequency conversion.

The temperature sensor 147 may be a simple thermo-electric transducer with an associated analog to digital converter, or a variety of other temperature detectors may be used. The temperature sensor is positioned on or inside of the fixture, typically at a point that is near the LEDs or other sources that produce most of the system heat. The temperature sensor 147 provides a signal representing the measured temperature to the microcontroller 129. The system logic, here implemented by the microcontroller 129, can adjust intensity of one or more of the LEDs in response to the sensed temperature, e.g. to reduce intensity of the source outputs to compensate for temperature increases. The program of the microcontroller 129, however, would typically manipulate the intensities of the various LEDs so as to maintain the desired color balance between the various wavelengths of light used in the system, even though it may vary the overall intensity with temperature. For example, if temperature is increasing due to increased drive current to the active LEDs (with increased age or heat), the controller may deactivate one or more of those LEDs and activate a corresponding number of the sleepers, since the newly activated sleeper(s) will provide similar output in response to lower current and thus produce less heat.

The above discussion of FIG. 9 related to programmed digital implementations of the control logic. Those skilled in the art will recognize that the control also may be implemented using analog circuitry. FIG. 10 is a circuit diagram of a simple analog control for a lighting apparatus (e.g. of the type shown at 19 in FIG. 1) using Red, Green and Blue LEDs. Assume for this discussion that a separate fixed or variable source (not shown) supplies power to a light bulb serving as the white light source. The user establishes the levels of intensity for each type of LED light emission (Red, Green or Blue) by operating a corresponding one of the potentiometers. The circuitry essentially comprises driver circuits for supplying adjustable power to two or three sets of LEDs (Red, Green and Blue) and analog logic circuitry for adjusting the output of each driver circuit in accord with the setting of a corresponding potentiometer. Additional potentiometers and associated circuits would be provided for additional colors of LEDs. Those skilled in the art should be able to implement the illustrated analog driver and control logic of FIG. 10 without further discussion.

Figure 11:
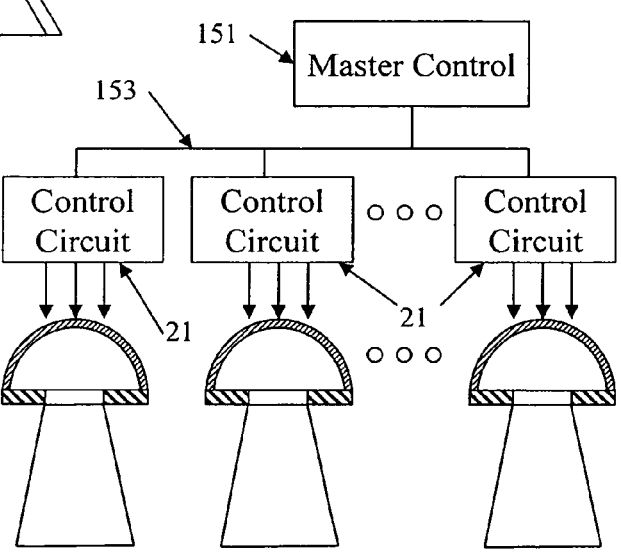
FIG. 11 is a diagram, illustrating a number of radiant energy emitting systems with common control from a master control unit.

The systems described above have a wide range of applications, where there is a desire to set or adjust color provided by a lighting fixture. These include task lighting applications, signal light applications, as wells as applications for illuminating an object or person. Some lighting applications involve a common overall control strategy for a number of the systems. As noted in the discussion of FIG. 9, the control circuitry may include a communication interface 139 or 141 allowing the microcontroller 129 to communicate with another processing system. FIG. 11 illustrates an example in which control circuits 21 of a number of the radiant energy generation systems with the light integrating and distribution type fixture communicate with a master control unit 151 via a communication network 153. The master control unit 151 typically is a programmable computer with an appropriate user interface, such as a personal computer or the like. The communication network 153 may be a LAN or a wide area network, of any desired type. The communications allow an operator to control the color and output intensity of all of the linked systems, for example to provide combined lighting effects.

The commonly controlled lighting systems may be arranged in a variety of different ways, depending on the intended use of the systems. FIG. 13 for example, shows a somewhat random arrangement of lighting systems. The circles represent the output openings of those systems, such as the large opening of the system deflectors. The dotted lines represent the fields of the emitted radiant energy. Such an arrangement of lighting systems might be used to throw desired lighting on a wall or other object and may allow the user to produce special lighting effects at different times. Another application might involve providing different color lighting for different speakers during a television program, for example, on a news program, panel discussion or talk show.

Figure 15:
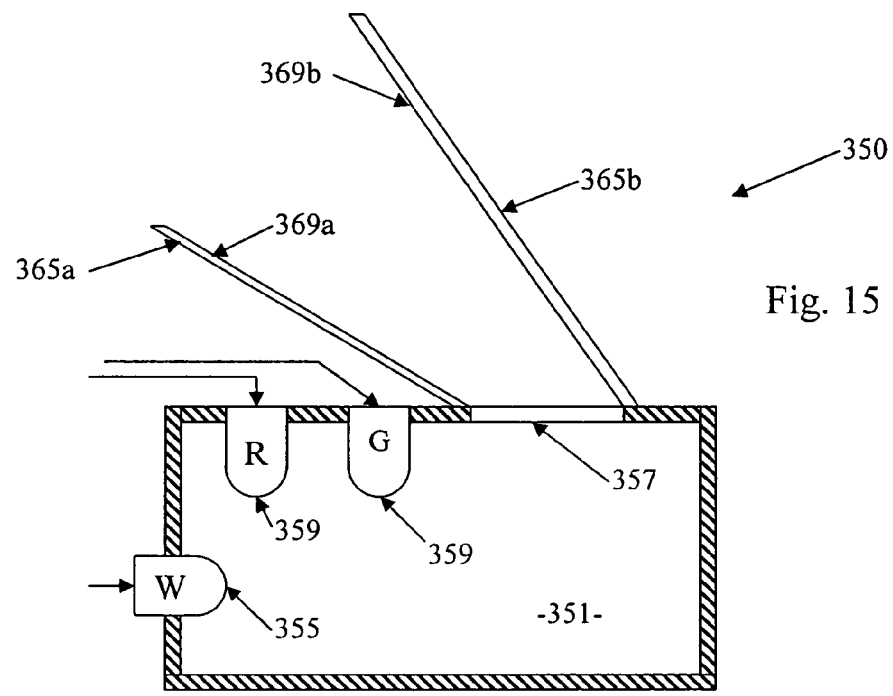
FIG. 15 is a cross-sectional view of another example of an optical cavity LED light fixture, as might be used for a "wall-washer" application, using a combination of a white light source and a plurality of primary color light sources.
Figure 16:
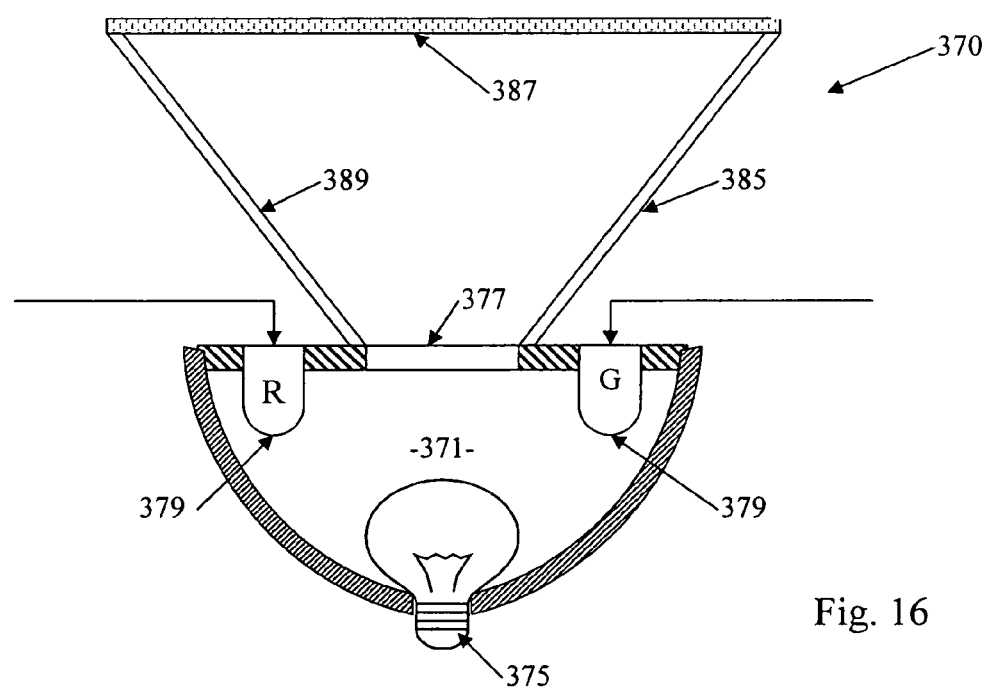
FIG. 16 is a cross-sectional view of another example of an optical cavity LED light fixture, in this case using a deflector and a combination of a white light source and a plurality of primary color light sources.

In the examples above, a deflector, mask or shoulder was used to provide further optical processing of the integrated white light emerging from the aperture of the fixture. A variety of other optical processing devices may be used in place of or in combination with any of those optical processing elements. Examples include various types of diffusers, collimators, variable focus mechanisms, and iris or aperture size control mechanisms. Several of these examples are shown in FIGS. 15-16.

Figure 13A:
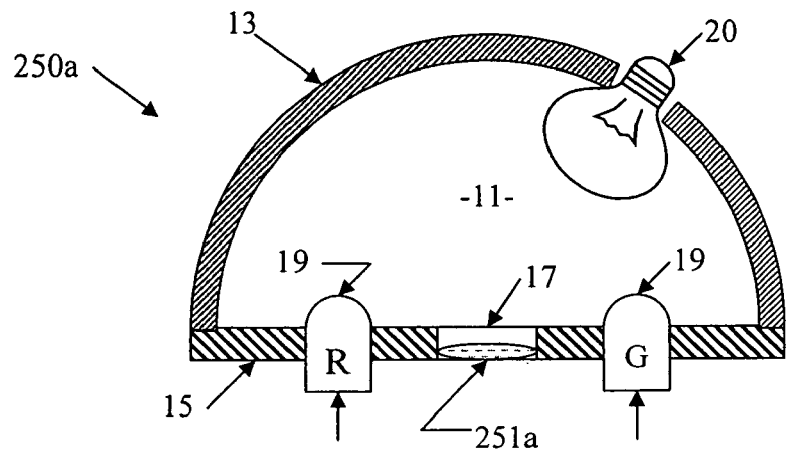
FIGS. 13A to 13C are cross-sectional views of additional examples, of optical cavity LED light fixtures, with several alternative elements for processing of the combined light emerging from the cavity.
Figure 13B:
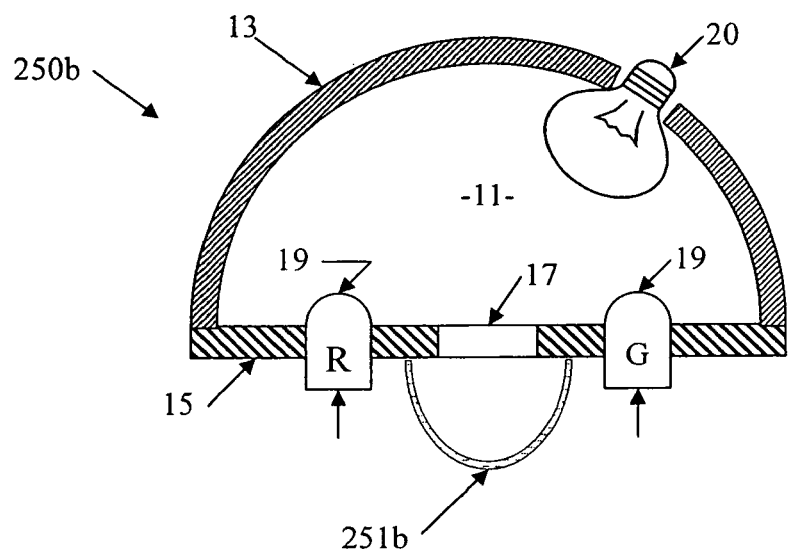
Figure 13C:
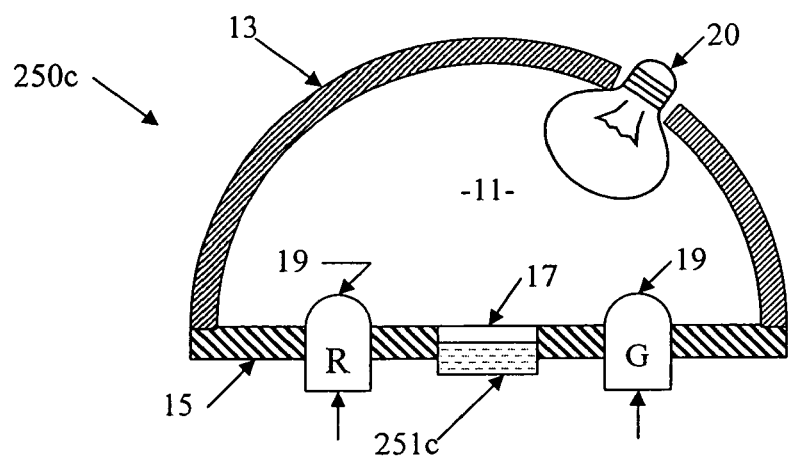

FIGS. 13A to 13C are cross-sectional views of several examples of optical cavity LED fixtures using various forms of secondary optical processing elements to process the integrated energy emitted through the aperture. Although similar fixtures may process and emit other radiant energy spectra, for discussion here we will assume these "lighting" fixtures process and emit white light in the visible part of the spectrum. These first three examples are similar to each other, and the common aspects are described first. Each fixture 250 (250a to 250c in FIGS. 13A to 13C, respectively) includes an optical integrating cavity 11, at least one source 20 of white light and LEDs 19, similar to those in the example of FIG. 1. A power source and control circuit similar to those used in the earlier examples provide the drive currents for the LEDs, and in view of the similarity, the power source and control circuit are omitted from these figures, to simplify the illustrations.

In the examples of FIGS. 13A to 13C, each light fixture 250a to 250c includes an optical integrating cavity 11, formed by a dome 11 and a cover plate 15. The surfaces of the dome 13 and cover 15 forming the interior surface(s) of the cavity 11 are diffusely reflective. One or more apertures 17, in these examples formed through the plate 15, provide a light passage for transmission of reflected and integrated white light outward from the cavity 11. Materials, positions, orientations and possible shapes for the elements 11 to 17 have been discussed above.

As in the earlier examples, each fixture 250a to 250c includes a number of LEDs 19 emitting light of different wavelengths into the cavity 11, as in the example of FIG. 1. A number of the LEDs will be active, from initial start-up, whereas others may initially be inactive 'sleepers,' as also discussed above. The possible combinations and positions of the LEDs 19 have been discussed in detail above, in relation to the earlier examples. Again, the LEDs 19 emit light of multiple colors into the interior of the optical integrating cavity. Control of the amplitudes of the drive currents applied to the LEDs 19 controls the amount of each light color supplied into the cavity 11. A source 20, such as another LED or an appropriate lamp or bulb, supplies substantially white light into the cavity 11. The cavity 11 integrates the various amounts of light from the different sources into a combined white light of the selected spectral characteristic for emission through the aperture 17.

The three examples (FIGS. 13A to 13C) differ as to the processing element coupled to the aperture 17 that processes the selected white light output coming out of the aperture 17. In the example of FIG. 13A, instead of a deflector as in FIG. 1, the fixture 250a includes a lens 251a in or covering the aperture 17. The lens may take any convenient form, for focusing or diffusing the emitted combined light, as desired for a particular application of the fixture 250a. The lens 251a may be clear or translucent.

In the example of FIG. 13B, the fixture 250b includes a curved transmissive diffuser 251a covering the aperture 17. The diffuser may take any convenient form, for example, a white or clear dome of plastic or glass. Alternatively, the dome may be formed of a prismatic material. In addition to covering the aperture, the element 251b diffuses the emitted white light, as desired for a particular application of the fixture 250b. The dome shaped diffuser may cover just the aperture, as shown at 251b, or it may cover the backs of the LEDs 19 as well.

In the example of FIG. 13C, a holographic diffraction plate or grading 251c serves as the optical output processing element in the fixture 250c. The holographic grating is another form of diffuser. The holographic diffuser 251c is located in the aperture 17 or attached to the plate 15 to cover the aperture 17. A holographic diffuser provides more precise control over the diffuse area of illumination and increases transmission efficiency. Holographic diffusers and/or holographic films are available from a number of manufacturers, including Edmund Industrial Optics of Barrington, N.J.

Those skilled in the art will recognize that still other light processing elements may be used in place of the output lens 251a, the diffuser 251b and the holographic diffuser 251c, to process or guide the integrated light output. For example, a fiber optic bundle may be used to channel the light to a desired point and/or in a desired direction.

The exemplary systems discussed herein may have any size desirable for any particular application. A system may be relatively large, for lighting a room or providing spot or flood lighting. The system also may be relatively small, for example, to provide a small pinpoint of light, for an indicator or the like. The system 250a, with or even without the lens, is particularly amenable to miniaturization. For example, instead of a plate to support the LEDs, the LEDs could be manufactured on a single chip. If it was not convenient to provide the aperture through the chip, the aperture could be formed through the reflective dome.

Figure 14:
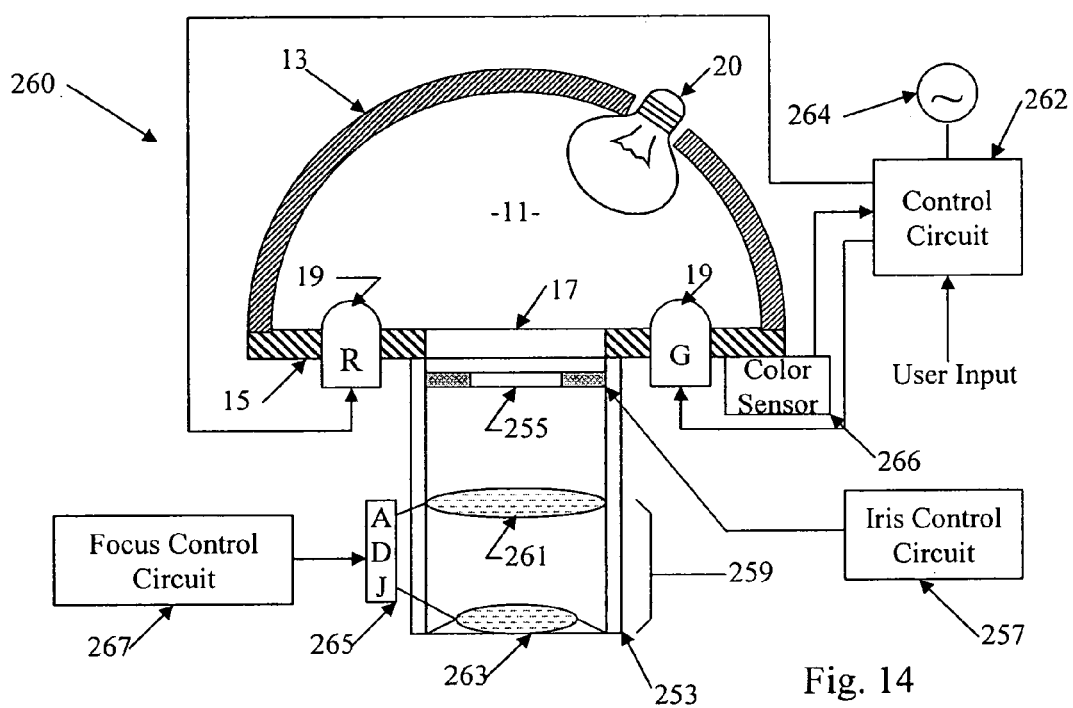
FIG. 14 is a cross-sectional view of another example of an optical cavity LED light fixture, using a collimator, iris and adjustable focusing system to process the combined light output.

FIG. 14 illustrates another example of a "lighting" system 260 with an optical integrating cavity LED light fixture, having yet other elements to optically process the combined color light output. The system 260 includes an optical integrating cavity and LEDs similar to those in the examples of FIG. 1 and FIGS. 13A to 13C, and like reference numerals are used to identify the corresponding components.

In the example of FIG. 16, the light fixture includes an optical integrating cavity 11, formed by a dome 11 and a cover plate 15. The surfaces of the dome 13 and cover 15 forming the interior surface(s) of the cavity 11 are diffusely reflective. One or more apertures 17, in this example formed through the plate 15, provide a light passage for transmission of reflected and integrated white light outward from the cavity 11. Materials, possible shapes, positions and orientations for the elements 11 to 17 have been discussed above. As in the earlier examples, the system 260 includes a number of LEDs 19 emitting light of different wavelengths into the cavity 11. The possible combinations and positions of the LEDs 19 have been discussed in detail above, in relation to the earlier examples.

The LEDs 19 emit light of multiple colors into the interior of the optical integrating cavity 11. In this example, the light colors are in the visible portion of the radiant energy spectrum. Control of the amplitudes of the drive currents applied to the LEDs 19 controls the amount of each light color supplied into the cavity 11. A source 20, such as another LED or an appropriate lamp or bulb, supplies substantially white light into the cavity 11. A number of the LEDs will be active, from initial start-up, whereas others may initially be inactive 'sleepers,' as discussed above. The cavity 11 integrates the various amounts of light of the different colors with the substantially white input light, to form a combined white light of a selected color balance or temperature, for emission through the aperture 17.

The system 260 also includes a control circuit 262 coupled to the LEDs 19 for establishing output intensity of radiant energy of each of the LED sources. The control circuit 262 typically includes a power supply circuit coupled to a source, shown as an AC power source 264, although the power source 264 may be a DC power source. In either case, the circuit 262 may be adapted to process the voltage from the available source to produce the drive currents necessary for the LEDs 19 (and possibly to the source 20). The control circuit 262 includes an appropriate number of LED driver circuits, as discussed above relative to FIGS. 9 and 10, for controlling the power applied to each of the individual LEDs 19 and thus the intensity of radiant energy supplied to the cavity 11 for each different type/color of light. Control of the intensity of emission of each of the LED sources sets a spectral characteristic of the combined white light energy emitted through the aperture 17 of the optical integrating cavity 11, in this case, the color characteristic(s) of the visible white light output.

The control circuit 262 may respond to a number of different control input signals, for example, to one or more user inputs as shown by the arrow in FIG. 14. Feedback may also be provided by a temperature sensor (not shown in this example) or one or more color sensors 266. The color sensor(s) 266 may be located in the cavity or in the element or elements for processing light emitted through the aperture 17. However, in many cases, the plate 15 and/or dome 13 may pass some of the integrated light from the cavity, in which case, it is actually sufficient to place the color light sensor(s) 266 adjacent any such transmissive point on the outer wall that forms the cavity. In the example, the sensor 266 is shown attached to the plate 15. Details of the control feedback have been discussed earlier, with regard to the circuitry in FIG. 9.

The example of FIG. 14 utilizes a different arrangement for directing and processing the white light after emission from the cavity 11 through the aperture 17. This system 260 utilizes a collimator 253, an adjustable iris 255 and an adjustable focus lens system 259.

The collimator 253 may have a variety of different shapes, depending on the desired application and the attendant shape of the aperture 17. For ease of discussion here, it is assumed that the elements shown are circular, including the aperture 17. Hence, in the example, the collimator 253 comprises a substantially cylindrical tube, having a circular opening at a proximal end coupled to the aperture 17 of the optical integrating cavity 11. The system 260 emits white light of a selected desired spectral character, toward a desired field of illumination, via the circular opening at the distal end of the collimator 253.

The interior surface of the collimator 253 is reflective. The reflective inner surface may be diffusely reflective or quasi-specular. Typically, in this embodiment, the interior surface of the deflector/collimator element 253 is specular. The tube forming the collimator 253 also supports a series of elements for optically processing the collimated and integrated light. Those skilled in the art will be familiar with the types of processing elements that may be used, but for purposes of understanding, it may be helpful to consider two specific types of such elements.

First, the tube forming the collimator 253 supports a variable iris. The iris 257 represents a secondary aperture, which effectively limits the output opening and thus the intensity of white light that may be output by the system 260. Although shown in the collimator tube, the iris may be mounted in or serve as the aperture 17. A circuit 257 controls the size or adjustment of the opening of the iris 255. In practice, the user activates the LED control circuit (see e.g. 21 in FIG. 1) to set the color balance or temperature of the output light, that is to say, so that the system 260 outputs white light of a desired color variation. The overall intensity of the output light is then controlled through the circuit 257 and the iris 255. Opening the iris 255 wider provides higher output intensity, whereas reducing the iris opening size decreases intensity of the light output.

In the system 260, the tube forming the collimator 253 also supports one or more lens elements of the adjustable focusing system 259, shown by way of example as two lenses 261 and 263. Spacing between the lenses and/or other parameters of the lens system 259 are adjusted by a mechanism 265, in response to a signal from a focus control circuit 267. The elements 261 to 267 of the system 259 are shown here by way of example, to represent a broad class of elements that may be used to variably focus the emitted light in response to a control signal or digital control information or the like. If the system 260 serves as a spot light, adjustment of the lens system 259 effectively controls the size of the spot on the target object or subject that the system illuminates. Those skilled in the art will recognize that other optical processing elements may be provided, such as a mask to control the shape of the illumination spot or various shutter arrangements for beam shaping.

Although shown as separate control circuits 257 and 267, the functions of these circuits may be integrated together with each other or integrated into the circuit 262 that controls the operation of the LEDs 19. For example, the system might use a single microprocessor or similar programmable microcontroller, which would run control programs for the LED drive currents, the iris control and the focus control.

The optical integrating cavity 11 and the LEDs 19 produce white light of a precisely controlled composite color balance or temperature. As noted, control of the LED currents controls the amount of each color of light integrated into the white output. Control of the opening provided by the iris 255 then controls the intensity of the integrated light output of the system 260. Control of the focusing by the system 259 enables control of the breadth of the light emissions and thus the spread of the area or region to be illuminated by the system 260. Other elements may be provided to control beam shape. Professional production lighting applications for such a system include theater or studio lighting, for example, where it is desirable to control the color (temperature or balance), intensity and the size of a spotlight beam. By connecting the LED control circuit 257, the iris control circuit 257 and the focus control circuit 267 to a network similar to that in FIG. 11, it becomes possible to control color characteristics of the white light, intensity and the spot size of many lights from a remote network terminal, for example, at an engineer's station in the studio or theater.

The discussion of the examples above has mainly referenced illuminance type lighting applications, for example to illuminate rooms or provide spot lighting in a theater or studio. Only brief mention has been given so far, of other applications. Those skilled in the art will recognize, however, that the principles discussed herein may also find wide use in other applications, particularly in luminance applications, such as various kinds of signal lighting.

FIG. 15 is a cross sectional view of an example of a wall washer type fixture 350. The fixture 350 includes an optical integrating cavity 351 having a diffusely reflective inner surface, as in the earlier examples. In this fixture, the cavity 351 has a substantially rectangular cross-section. As shown, the fixture 350 includes at least one white light source, represented by the white LED 355. The fixture also includes several LEDs 359 of the various primary colors, typically red (R), green (G) and blue (B, not visible in this cross-sectional view). The LEDs 359 include both initially-active LEDs and sleeper LEDs, and the LEDs 359 are similar to those in the earlier examples. Again, the LEDs emit controlled amounts of multiple colors of light into the optical integrating cavity 351 formed by the inner surfaces of a rectangular member 353. A power source and control circuit similar to those used in the earlier examples provide the drive currents for the LEDs 359, and in this example, that same circuit controls the drive current applied to the white LED 355. In view of the similarity, the power source and control circuit are omitted from FIG. 15, to simplify the illustration.

One or more apertures 357, of the shape desired to facilitate the particular lighting application, provide light passage for transmission of reflected and integrated white light outward from the cavity 351. The aperture may be laterally centered, as in the earlier examples; however, in this example, the aperture is off-center to facilitate a light-through to the left (in the illustrated orientation). Materials for construction of the cavity and the types of LEDs that may be used are similar to those discussed relative to the earlier examples.

Here, it is assumed that the fixture 350 is intended to principally provide white light, for example, to illuminate a wall or product to the left and somewhat above the fixture. The presence of the white light source 355 increases the intensity of white light that the fixture produces. The control of the outputs of the primary color LEDs 359 allows the operator to correct for any variations of the white light from the source 355 from normal white light and/or to adjust the color balance/temperature of the light output. For example, if the white light source 355 is an LED as shown, the white light it provides tends to be rather blue. The intensities of light output from the LEDs 359 can be adjusted to compensate for this blueness, for example, to provide a light output approximating sunlight or light from a common incandescent source, as or when desired.

As another example of operation, the fixture 350 (or any of the earlier fixtures) may be used to illuminate products, e.g. as displayed in a store or the like, although it may be rotated or inverted for such a use. Different products may present a better impression if illuminated by white light having a different balance. For example, fresh bananas may be more attractive to a potential customer when illuminated by light having more yellow tones. Soda sold in red cans, however, may be more attractive to a potential customer when illuminated by light having more red tones. For each product, the user can adjust the intensities of the light outputs from the LEDs 359 and/or 355 to produce light that appears substantially white if observed directly by a human/customer but provides the desired highlighting tones and thereby optimizes lighting of the particular product that is on display.

The fixture 350 may have any desired output processing element(s), as discussed above with regard to various earlier examples. In the illustrated wall washer embodiment (FIG. 15), the fixture 350 includes a deflector to further process and direct the light emitted from the aperture 357 of the optical integrating cavity 351, in this case toward a wall or product somewhat to the left of and above the fixture 350. The deflector is formed by two opposing panels 365a and 365b having reflective inner surfaces 365a and 365b. Although other shapes may be used to direct the light output to the desired area or region, the illustration shows the panel 365a, 365b as relatively flat panels set at somewhat different angle extending to the left, in the illustrated orientation. Of course, as for all the examples, the fixture may be turned at any desired angle or orientation to direct the light to a particular region or object to be illuminated by the fixture, in a given application.

As noted, each panel 365a, 365b has a reflective interior surface 369a, 369b. As in the earlier examples, all or portions of the deflector surfaces may be diffusely reflective, quasi-specular or specular. In the wall washer example, the deflector panel surface 369b is diffusely reflective, and the deflector panel surface 369a has a specular reflectivity, to optimize distribution of emitted light over the desired area of the wall illuminated by the fixture 350. The output opening of the deflector 365 may be covered with a grating, a plate or lens, although in the illustrated wall washer example, such an element is omitted.

FIG. 16 is a cross-sectional view of another example of an optical integrating cavity type light fixture 370. This example uses a deflector and lens to optically process the light output, and like the example of FIG. 23 the fixture 370 includes LEDs to produce various colors of light in combination with a white light source. The fixture 370 includes an optical integrating cavity 371, formed by a dome and a cover plate, although other structures may be used to form the cavity. The surfaces of the dome and cover forming the interior surface(s) of the cavity 371 are diffusely reflective. One or more apertures 377, in this example formed through the cover plate, provide a light passage for transmission of reflected and integrated light outward from the cavity 371. Materials, sizes, orientation, positions and possible shapes for the elements forming the cavity and the types/numbers of LEDs have been discussed above.

As shown, the fixture 370 includes at least one white light source. Although the white light source could comprise one or more LEDs, as in several of the previous examples, in this embodiment, the white light source comprises a lamp 375. The lamp may be any convenient form of light bulb, such as an incandescent or fluorescent light bulb; and there may be one, two or more bulbs to produce a desired amount of white light. A preferred example of the lamp 375 is a quartz halogen light bulb. The fixture also includes several LEDs 379 of the various primary colors, typically red (R), green (G) and blue (B, not visible in this cross-sectional view), although additional colors may be provided or other color LEDs may be substituted for the RGB LEDs. Some LEDs will be active from initial operation. Other LEDs may be held in reserve as sleepers. The LEDs 379 are similar to those in the earlier examples, for emitting controlled amounts of multiple colors of light into the optical integrating cavity 371.

A power source and control circuit similar to those used in the earlier examples provide the drive currents for the LEDs 359. In view of the similarity, the power source and control circuit for the LEDs are omitted from FIG. 16, to simplify the illustration. The lamp 375 may be controlled by the same or similar circuitry, or the lamp may have a fixed power source.

The white light source 375 may be positioned at a point that is not directly visible through the aperture 377 similar to the positions of the LEDs 379. However, for some applications requiring relatively high white light output intensity, it may be preferable to position the white light source 375 to emit a substantial portion of its light output directly through the aperture 377 as in this particular example.

The fixture 370 may incorporate any of the further optical processing elements discussed above. For example, the fixture may include a variable iris and variable focus system, as in the embodiment of FIG. 14. In the illustrated version, however, the fixture 370 includes a deflector 385 to further process and direct the light emitted from the aperture 377 of the optical integrating cavity 371. The deflector 385 has a reflective interior surface 389 and expands outward laterally from the cavity aperture, as it extends away from the cavity toward the region to be illuminated. In a circular implementation, the deflector 385 would be conical. Of course, for applications using other fixture shapes, the deflector may be formed by two or more panels of desired sizes and shapes. The interior surface 389 of the deflector 385 is reflective. As in the earlier examples, all or portions of the reflective deflector surface(s) may be diffusely reflective, quasi-specular, specular or combinations thereof.

As shown in FIG. 16, a small opening at a proximal end of the deflector 385 is coupled to the aperture 377 of the optical integrating cavity 311. The deflector 385 has a larger opening at a distal end thereof. The angle of the interior surface 389 and size of the distal opening of the deflector 385 define an angular field of radiant energy emission from the apparatus 370.

The large opening of the deflector 385 is covered with a grating, a plate or the exemplary lens 387. The lens 387 may be clear or translucent to provide a diffuse transmissive processing of the light passing out of the large opening. Prismatic materials, such as a sheet of microprism plastic or glass also may be used. In applications where a person may look directly at the fixture 370 from the illuminated region, it is preferable to use a translucent material for the lens 387, to shield the observer from directly viewing the lamp 375.

The fixture 370 thus includes a deflector 385 and lens 387, for optical processing of the integrated light emerging from the cavity 371 via the aperture 377. Of course, other optical processing elements may be used in place of or in combination with the deflector 385 and/or the lens 387, such as those discussed above relative to FIGS. 15A to 15C and 16.

In the fixture of FIG. 17, the lamp 375 provides substantially white light of relatively high intensity. The integration of the light from the LEDs 379 in the cavity 375 supplements the light from the lamp 375 with additional colors, and the amounts of the different colors of light from the LEDs can be precisely controlled. Control of the light added from the LEDs 379 can provide color correction and/or adjustment, as discussed above.

As shown by the discussion above, each of the various lighting systems with multiple color sources and an optical cavity to combine the energy from the sources provides a highly effective means to control a spectral characteristic of white light produced by one or more fixtures. The output spectral characteristic is controlled simply by controlling the intensity of each of the color sources supplying radiant energy to the chamber.

Settings for a desirable color are easily reused or transferred from one system/fixture to another. If color/temperature/balance offered by particular settings are found desirable, e.g. to light a particular product on display or to illuminate a particular person in a studio or theater, it is a simple matter to record those settings and apply them at a later time. Similarly, such settings may be readily applied to another system or fixture, e.g. if the product is displayed at another location or if the person is appearing in a different studio or theater. It may be helpful to consider the product and person lighting examples in somewhat more detail.

For the product, assume that a company will offer a new soft drink in a can having a substantial amount of red product markings. The company can test the product under lighting using one or more fixtures as described herein, to determine the optimum color to achieve a desired brilliant display. In a typical case, the light will generally be white to the observer. In the case of the red product container, the white light will have a relatively high level of red, to make the red markings seem to glow when the product is viewed by the casual observer/customer. When the company determines the appropriate settings for the new product, it can distribute those settings to the stores that will display and sell the product. The stores will use other fixtures of any type disclosed herein. The fixtures in the stores need not be of the exact same type that the company used during product testing. Each store uses the settings received from the company to establish the spectral characteristic(s) of the lighting applied to the product by the store's fixture(s), in our example, so that each product display provides the desired brilliant red illumination of the company's new soft drink product.

Consider now a studio lighting example for an actor or newscaster. The person is tested under lighting using one or more fixtures as described herein, to determine the optimum color to achieve desired appearance in video or film photography of the individual. Again, the light will generally be white to the observer, but each person will appear better at somewhat different temperature or color balance levels. One person might appear more healthy and natural under warmer light, whereas another might appear better under bluer/colder white light. After testing to determine the person's best light color settings, the settings are recorded. Each time the person appears under any lighting using the systems disclosed herein, in the same or a different studio, the technicians operating the lights can use the same settings to control the lighting and light the person with light of exactly the same spectral characteristic(s). Similar processes may be used to define a plurality of desirable lighting conditions for the actor or newscaster, for example, for illumination for different moods or different purposes of the individual's performances.

Figure 12:
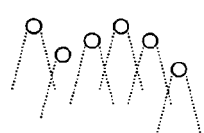
FIG. 12 is a layout diagram, useful in explaining an arrangement of a number of the fixtures of the system of FIG. 11.

The methods for defining and transferring set conditions, e.g. for product lighting or personal lighting, can utilize manual recordings of settings and input of the settings to the different lighting systems. However, it is preferred to utilize digital control, in systems such as described above relative to FIGS. 10 and 12. Once input to a given lighting system, a particular set of parameters for a product or individual become another 'preset' lighting recipe stored in digital memory, which can be quickly and easily recalled and used each time that the particular product or person is to be illuminated.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting apparatus, for a visible illuminating type lighting application, to illuminate or to provide task or object illumination in a region or area intended to be occupied by a person, the apparatus comprising:
   a first source of light of a first wavelength;
   a second source of light of a second wavelength, the second wavelength being different from the first wavelength;
   a third source of light, wherein the third source produces substantially white light; and
   an optical integrating cavity having a diffusely reflective interior surface for receiving and integrating light of the first and second wavelengths and the substantially white light, from the sources of light, via multiple diffuse reflections from the reflective interior surface, to form white light of a desired spectral characteristic, and having an aperture for allowing emission of the white light of the desired spectral characteristic in a direction to facilitate said visible illuminating type lighting application.

2. The apparatus of claim 1, further comprising an optical processing element coupled to the aperture of the optical cavity.

3. The apparatus of any of claim 2, wherein the optical processing element comprises at least one element selected from the group consisting of:
   a variable opening iris, a variable focusing lens system, a light collimator, and a transmissive diffuser.

4. The apparatus of claim 1, further comprising adjustable control circuitry coupled to the first and second sources for establishing intensity of light from each of the sources, so as to adjust the spectral characteristic of white light emitted through the aperture.

5. The apparatus of claim 1, wherein:
   the first source comprises one or more light emitting diodes for emitting light of a first visible color; and
   the second source comprises one or more light emitting diodes for emitting light of a second visible color, wherein the second color is different from the first color.

6. The apparatus of claim 5, wherein:
   the one or more first color light emitting diodes comprise an initially active light emitting diode for emitting light of the first color and an initially inactive light emitting diode for emitting light of the first color on an as needed basis; and
   the one or more second color light emitting diodes comprises an initially active light emitting diode for emitting light of the second color and an initially inactive light emitting diode for emitting light of the second color on an as needed basis.

7. The apparatus of any of claim 5, wherein the third source comprises one or more white light emitting diodes or one or more incandescent or fluorescent light bulbs.

8. The apparatus of claim 1, further comprising a fourth source for supplying light of a third wavelength into the optical cavity for combination with the light of the first and second wavelengths and with the substantially white light, the third wavelength being different from the first wavelength and from the second wavelength.

9. The apparatus of claim 8, wherein:
   the first source comprises one or more light emitting diodes for emitting light of a first visible color;
   the second source comprises one or more light emitting diodes for emitting light of a second visible color, wherein the second color is different from the first color; and
   the fourth source comprises one or more light emitting diodes for emitting light of a third visible color, wherein the third color is different from the first color and from the second color.

10. The apparatus of claim 9, wherein the first, second and third colors are red, green and blue, respectively.

11. A lighting apparatus, for a white light illuminating type application, to illuminate or to provide task or object illumination in a region or area intended to be occupied by a person, the apparatus comprising:
    a chamber having at least one diffusely reflective interior surface for combining at least some light by diffuse reflection within the chamber and having an optical passage for allowing emission of combined light from the chamber in a direction to facilitate said white light illuminating type application;
    a first source for producing substantially white light, the first source being coupled to supply the substantially white light to the interior of the chamber;
    a second source for producing light of a defined wavelength, the second source being coupled to supply the light of the defined wavelength to the interior of the chamber, so that the emission of combined light from the chamber is white light of a spectral characteristic determined by a combination of the substantially white light and the light of the defined wavelength; and
    a control circuit coupled to the sources for establishing output intensity of light of each of the sources to set contributions of the substantially white light and the light of the defined wavelength to the combined light and thus set the spectral characteristic of the combined white light emitted through the optical passage of the chamber.

12. The lighting apparatus of claim 11, wherein the first source comprises one or more white light emitting diodes, for emitting the substantially white light.

13. The lighting apparatus of claim 11, wherein the diffusely reflective interior surface and the optical passage are configured so that the chamber acts as an optical integrating cavity such that the combined white light emitted through the optical passage of the chamber is highly uniform.

14. The lighting apparatus of claim 11, wherein the optical passage of the chamber includes a transmissive diffuser.

15. The lighting apparatus of claim 11, wherein the optical passage of the chamber comprises an aperture through a wall of the chamber.

16. The lighting apparatus of claim 11, wherein each of the sources comprises one or more light emitting diodes.

17. The lighting apparatus of claim 11, further comprising:
    a third source for producing light of another defined wavelength,
    wherein the third source is coupled to supply the light of the other defined wavelength to the interior of the chamber, so that the emission of combined light from the chamber is white light of a spectral characteristic determined by a combination of the substantially white light, the light of the defined wavelength and the light of the other defined wavelength.

18. The lighting apparatus of claim 17, wherein each of the sources comprises one or more light emitting diodes.

19. The lighting apparatus of claim 11, further comprising:
a user interface for receiving a user input relating to a desired characteristic of the combined white light output of the apparatus,
wherein the control circuit establishes the output intensity of light of at least one of the sources in response to the user input.

20. The lighting apparatus of claim 11, further comprising:
a sensor responsive to the combined light,
wherein the control circuit maintains the spectral characteristic of the combined white light responsive to an output from the sensor.

21. The lighting apparatus of claim 20, wherein the sensor comprises a color sensor for sensing a color characteristic of the combined white light in the chamber.

22. The lighting apparatus of claim 20, wherein the sensor comprises a light intensity sensor for sensing intensity of at least some of the combined light in the chamber.

23. The lighting apparatus of claim 20, wherein the sensor comprises a temperature sensor.

24. The lighting apparatus of claim 11, wherein the chamber is configured so that the apparatus functions as a downlight.

25. The lighting apparatus of claim 24, wherein the first and second sources provide sufficient light energy for the combined light emitted through the optical passage to have a level sufficient for a task lighting application.

26. The lighting apparatus of claim 11, wherein the at least one interior surface of the chamber is white and is highly diffusely reflective, at least with respect to light from the sources.

27. The lighting apparatus of claim 26, wherein the at least one interior surface of the chamber exhibits reflectivity over 90%.

28. The lighting apparatus of claim 27, wherein the at least one surface of the chamber exhibits reflectivity of at least 98%.

29. The lighting apparatus of claim 26, wherein the at least one interior surface of the chamber has a shape corresponding to a substantial portion of a sphere.

30. The lighting apparatus of claim 26, wherein the at least one interior surface of the chamber has a shape corresponding to a substantial portion of a cylinder.

31. The lighting apparatus of claim 26, wherein the at least one interior surface of the chamber has a substantially rectangular cross-section.

32. A downlight for a white lighting application, the downlight comprising:
a chamber having at least one diffusely reflective interior surface for combining at least some light by diffuse reflection within the chamber and having an optical passage for allowing emission of combined light from the chamber in a downward direction to facilitate said white light application for the downlight;
at least one white light emitting diode (LED) coupled directly to the chamber, for producing substantially white light;
at least one single-colored light emitting diode (LED) coupled directly to the chamber, for producing a single color of light, so that the emission of combined light from the optical passage of the chamber is white light of a spectral characteristic determined by a combination of the substantially white light and the single color of light; and
a control circuit coupled to the LEDs for establishing output intensity of light of each of the LEDs to set contributions of the substantially white light and the light of the single color to the combined light and thus set the spectral characteristic of the combined white light emitted through the optical passage of the chamber for said white lighting application for the downlight.

33. The downlight of claim 32, wherein the diffusely reflective interior surface and the optical passage are configured so that the chamber acts as an optical integrating cavity such that the combined white light emitted through the optical passage of the chamber is highly uniform.

34. The downlight of claim 33, wherein the optical passage of the chamber includes a transmissive diffuser.

35. The downlight of claim 33, wherein the optical passage of the chamber comprises an aperture through a wall of the chamber.

36. The downlight of claim 33, wherein the at least one interior surface of the chamber is white and is highly diffusely reflective, at least with respect to light from the sources.

37. The downlight of claim 36, wherein the at least one interior surface of the chamber exhibits reflectivity over 90%.

38. The downlight of claim 37, wherein the at least one interior surface of the chamber exhibits reflectivity of at least 98%.

39. The downlight of claim 33, wherein the at least one interior surface of the chamber has a shape corresponding to a substantial portion of a sphere.

40. The downlight of claim 33, wherein the at least one interior surface of the chamber has a shape corresponding to a substantial portion of a cylinder.

41. The downlight of claim 33, wherein the at least one interior surface of the chamber has a substantially rectangular cross-section.

42. The downlight of claim 32, wherein the LEDs provide sufficient light energy for the combined light emitted through the optical passage to have a level sufficient for a task lighting application.

43. The downlight of claim 32, further comprising:
at least one additional single-colored light emitting diode (LED) coupled directly to the chamber, for producing another single color of light,
wherein the at least one additional single-colored LED is coupled to supply the light of the additional color to the interior of the chamber, so that the emission of combined light from the chamber is white light of a spectral characteristic determined by a combination of the substantially white light as well as the single colors of.

44. The downlight of claim 32, further comprising:
a user interface for receiving a user input relating to a desired characteristic of the combined white light output of the apparatus,
wherein the control circuit establishes the output intensity of light of at least one of the sources in response to the user input.

45. The downlight of claim 32, further comprising:
a sensor responsive to the combined light,
wherein the control circuit maintains the spectral characteristic of the combined white light responsive to an output from the sensor.

46. The downlight of claim 45, wherein the sensor comprises a color sensor for sensing a color characteristic of the combined white light in the chamber.

47. The downlight of claim 45, wherein the sensor comprises a light intensity sensor for sensing intensity of at least some of the combined light in the chamber.

48. The downlight of claim 45, wherein the sensor comprises a temperature sensor.

* * * * *